United States Patent
Iguchi et al.

(10) Patent No.: US 10,888,916 B2
(45) Date of Patent: Jan. 12, 2021

(54) TORSION BEAM MANUFACTURING METHOD, TORSION BEAM MANUFACTURING APPARATUS, AND TORSION BEAM

(71) Applicant: NIPPON STEEL & SUMITOMO METAL CORPORATION, Tokyo (JP)

(72) Inventors: Keinosuke Iguchi, Tokyo (JP); Masaaki Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 181 days.

(21) Appl. No.: 16/097,180

(22) PCT Filed: May 2, 2017

(86) PCT No.: PCT/JP2017/017257
§ 371 (c)(1),
(2) Date: Oct. 26, 2018

(87) PCT Pub. No.: WO2017/195706
PCT Pub. Date: Nov. 16, 2017

(65) Prior Publication Data
US 2019/0091756 A1  Mar. 28, 2019

(30) Foreign Application Priority Data

May 10, 2016  (JP) .................... 2016-094819

(51) Int. Cl.
*B60G 21/05* (2006.01)
*B21K 1/12* (2006.01)
(Continued)

(52) U.S. Cl.
CPC .................. *B21K 1/12* (2013.01); *B21J 5/02* (2013.01); *B21J 5/08* (2013.01); *B60G 9/04* (2013.01);
(Continued)

(58) Field of Classification Search
CPC .. B60G 21/051; B60G 2206/20; B60G 21/05; B21K 1/12
See application file for complete search history.

(56) References Cited

U.S. PATENT DOCUMENTS 6,758,921 B1 * 7/2004 Streubel ................. B21D 53/88
148/519
9,156,329 B2 * 10/2015 Peters .................... B21D 47/01
(Continued)

FOREIGN PATENT DOCUMENTS

DE         10139661 C1      2/2003
DE    102006005965 A1 *    8/2007 ........... B60G 21/051
(Continued)

OTHER PUBLICATIONS

Rudolf Schmidt, Welded rear axle for motor vehicle, May 3, 1995, EPO, EP 0 650 860 A1, English Abstract (Year: 1995).*
(Continued)

*Primary Examiner* — James A English
(74) *Attorney, Agent, or Firm* — Birch, Stewart, Kolasch & Birch, LLP

(57) ABSTRACT

This torsion beam manufacturing method is a method for manufacturing a torsion beam which is provided with a uniformly shaped closed cross-sectional portion in which a cross section orthogonal to a longitudinal direction is a closed cross section having a substantial V-shape or a substantial U-shape with a pair of ear portions, and a shape changing portion which leads to the uniformly shaped closed cross-sectional portion and in which a shape of the closed cross section changes progressively away from the uniformly shaped closed cross-sectional portion, the torsion beam manufacturing method comprising: thickening to form a pair of thickened portions in at least the shape changing portion by pressurizing each of the pair of ear portions from
(Continued)

outside against swelling of the pair of ear portions in a slate where both outer surfaces of each of the pair of ear portions are supported.

6 Claims, 15 Drawing Sheets

(51) Int. Cl.
*B21J 5/02* (2006.01)
*B21J 5/08* (2006.01)
*B60G 9/04* (2006.01)

(52) U.S. Cl.
CPC ........ *B60G 21/051* (2013.01); *B60G 2206/20* (2013.01); *B60G 2206/81022* (2013.01)

(56) References Cited

U.S. PATENT DOCUMENTS

| | | | |
|---|---|---|---|
| 2003/0044632 A1 | 3/2003 | Schonleber et al. | |
| 2011/0121639 A1 | 5/2011 | Fukushi et al. | |
| 2011/0260423 A1* | 10/2011 | Lepre | B21C 1/24 280/124.131 |
| 2014/0159334 A1* | 6/2014 | Jang | B60G 21/051 280/124.166 |
| 2019/0126714 A1 | 5/2019 | Wada et al. | |

FOREIGN PATENT DOCUMENTS

| | | | | |
|---|---|---|---|---|
| EP | 0650860 A1 | * | 5/1995 | ............. B60B 35/08 |
| EP | 1724132 A1 | | 11/2006 | |
| EP | 1818194 A1 | | 8/2007 | |
| JP | 2001-123227 A | | 5/2001 | |
| JP | 2008-63656 A | | 3/2008 | |
| JP | 2009-274077 A | | 11/2009 | |
| JP | 2010-247694 A | | 11/2010 | |
| JP | 2011-635 A | | 1/2011 | |
| JP | 2012-505784 A | | 3/2012 | |
| JP | 2013-91433 A | | 5/2013 | |
| JP | 2013256142 A | * | 12/2013 | |
| JP | 2013256260 A | * | 12/2013 | |
| JP | 2014-25773 A | | 2/2014 | |
| JP | 2016199209 A | * | 12/2016 | |
| JP | 6468043 B2 | | 2/2019 | |
| KR | 10-2018-0110042 A | | 10/2018 | |

OTHER PUBLICATIONS

Rudolf Schmidt, Welded rear axle for motor vehicle, May 3, 1995, EPO, EP 0 650 860 A1, Machine Translation of Description (Year: 1995).*
Drabon et al., Twist beam axle, Aug. 16, 2007, EPO, DE 10 2006 005 965 A1, English Abstract (Year: 2007).*
Drabon et al., Twist beam axle, Aug. 16, 2007, EPO, DE 10 2006 005 965 A1, Machine Translation of Description (Year: 2007).*
Ikoma et al., Torsion beam joining structure of torsion beam type suspension, Dec. 26, 2013, EPO, JP 2013-256142 A, English Abstract (Year: 2013).*
Ikoma et al., Torsion beam joining structure of torsion beam type suspension, Dec. 26, 2013, EPO, JP 2013-256142 A, Machine Translation of Description (Year: 2013).*
Extended European Search Report for counterpart European Application No. 17796067.1, dated Dec. 13, 2019.
"Hardness Tests and Hardness Number Conversions", Surface Vehicle Standard, SAE International J417, Jan. 2018, Downloaded from SAE International by null JSA, Wednesday, Sep. 19, 2018, total of 11 pages.
International Search Report for PCT/JP2017/017257 (PCT/ISA/210) dated Jul. 4, 2017.
Written Opinion of the International Searching Authority for PCT/JP2017/017257 (PCT/ISA/237) dated Jul. 4, 2017.
Korean Notice of Allowance for corresponding Korean Application No. 10-2018-7030748, dated Jan. 28, 2020, with English translation.

* cited by examiner

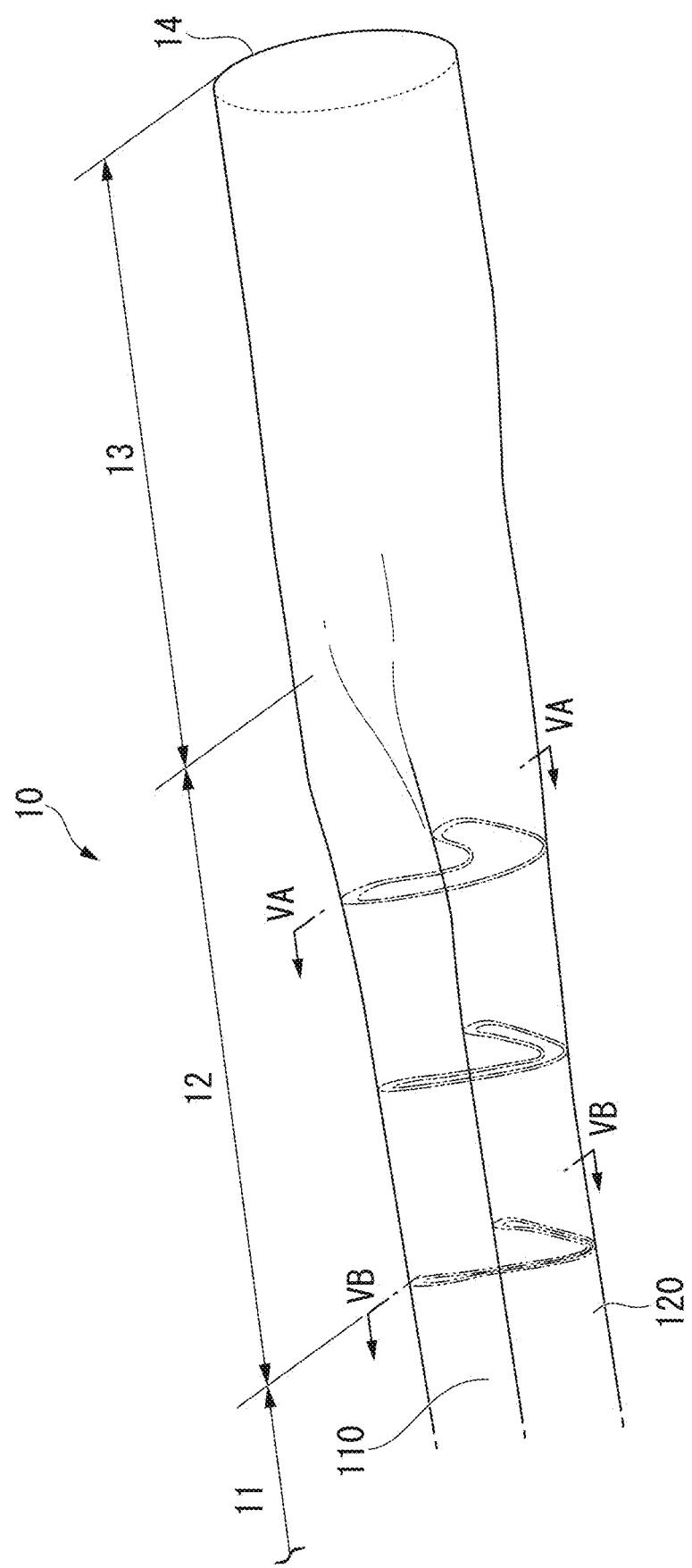

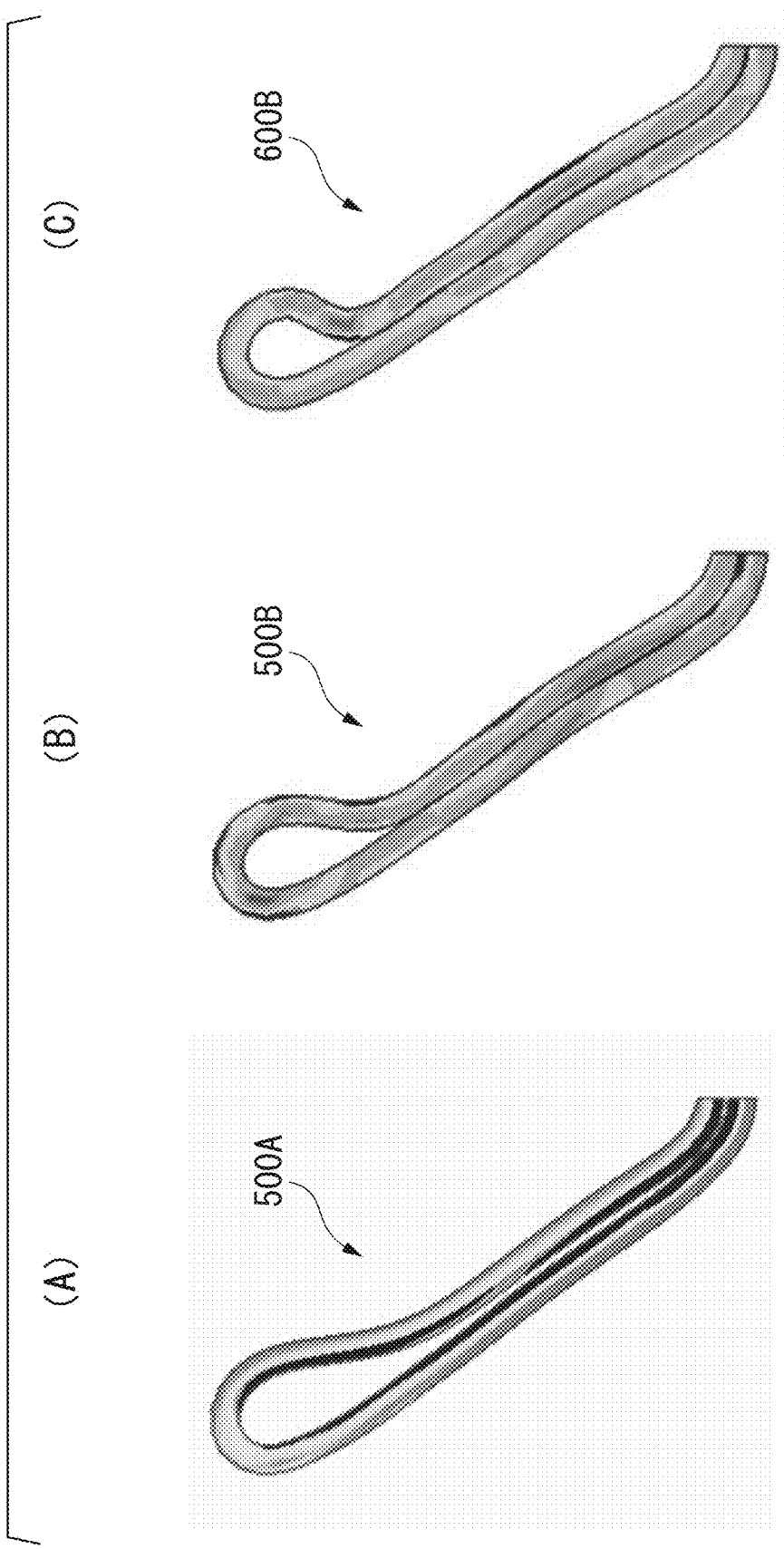

US 10,888,916 B2

TORSION BEAM MANUFACTURING METHOD, TORSION BEAM MANUFACTURING APPARATUS, AND TORSION BEAM

TECHNICAL FIELD OF THE INVENTION

The present invention relates to a torsion beam manufacturing method and a torsion beam manufacturing apparatus, for manufacturing a torsion beam which is applied to a torsion beam-type suspension apparatus for automobiles and in which metal fatigue is prevented. In addition, the present invention relates to a torsion beam manufactured by the torsion beam manufacturing method and the torsion beam manufacturing apparatus.

Priority is claimed on Japanese Patent Application No. 2016-094819, filed on May 10, 2016, the content of which is incorporated herein by reference.

RELATED ART

As is generally known, torsion beam-type suspension apparatuses have come into wide use as one of automobile suspension systems.

A torsion beam-type suspension apparatus includes: a torsion beam assembly in which a pair of right and left trailing arms rotatably supporting right and left wheels is coupled to a torsion beam and a pair of right and left spring receiving portions is joined to the vicinities of right and left ends of the torsion beam; and a spring and an absorber through which the torsion beam and a vehicle body are coupled to each other. The torsion beam is oscillatably connected to the vehicle body via pivot axes extending from the right and left toward a central side of the vehicle body.

For example, a torsion beam is formed by performing deformation processing of a metal pipe through press forming or hydro-form forming, and a cross section of the torsion beam orthogonal to a longitudinal direction thereof is formed into a closed cross section having a substantial V-shape or a substantial U-shape formed from attachment portions with respect to trailing arms toward a uniformly shaped closed cross-sectional portion (for example, refer to Patent Document 1).

The torsion beam includes the uniformly shaped closed cross-sectional portion, the attachment portions which are connected to the right and left trailing arms, and longitudinal direction shape changing portions (gradual change portions) which are positioned between the uniformly shaped closed cross-sectional portion and the attachment portions. In a case where a vehicle body receives an external force from a road surface, rolling rigidity of the vehicle body is ensured mainly by torsional rigidity of the torsion beam.

Meanwhile, even if the torsion beam has sufficient rolling rigidity, since the torsion beam receives various external forces from a road surface via the wheels or the trailing arms, a complicated stress distribution is generated due to such external forces.

Therefore, even in a case where various external forces are applied from a road surface, metal fatigue needs to be prevented from progressing, and various technologies have been developed to prevent such metal fatigue (for example, refer to Patent Documents 2, 3, and 4).

According to a technology disclosed in Patent Document 2, a press-formed torsion beam is subjected to quenching, tempering, and shot-peening, and thereby hardening an outer surface of the torsion beam so that fatigue properties of the torsion beam are improved.

According to a technology disclosed in Patent Document 3, surface hardness of a torsion beam is improved by using a steel pipe of which surface hardness increases after heat treatment, so that fatigue properties of the torsion beam are improved.

According to a technology disclosed in Patent Document 4, tensile stress is applied to a torsion beam, so that residual stress of the torsion beam is reduced and fatigue properties are improved.

PRIOR ART DOCUMENT

Patent Document

[Patent Document 1] Japanese Unexamined Patent Application, First Publication No. 2011-635
[Patent Document 2] Japanese Unexamined Patent Application, First Publication No. 2001-123227
[Patent Document 3] Japanese Unexamined Patent Application, First Publication No. 2008-063656
[Patent Document 4] Japanese Unexamined Patent Application, First Publication No. 2013-091433

DISCLOSURE OF THE INVENTION

Problems to be Solved by the Invention

However, it is not always easy to improve fatigue properties of a torsion beam by applying the technologies disclosed in Patent Documents 2 to 4, and there is a problem of an increase in: initial cost for investment of plants and equipments, and etc.; and manufacturing running cost. Therefore, there is a demand for a torsion beam manufacturing technology in which a torsion beam having excellent fatigue properties can be easily and efficiently manufactured.

The present invention has been made in consideration of the foregoing circumstances, and an object thereof is to provide a torsion beam having excellent fatigue properties. In addition, another object of the present invention is to provide a torsion beam manufacturing method and a torsion beam manufacturing apparatus capable of easily and efficiently manufacturing such a torsion beam.

Means for Solving the Problem

The inventors of the present invention have intensively investigated a technology for improving fatigue properties of a torsion beam used in a torsion beam-type suspension apparatus for automobiles. As a result, it has been ascertained that stress is likely to be concentrated in a folded wall portion (ear portion) connecting a first wall portion forming a recessed side outer surface and a second wall portion forming a projected side outer surface to each other in a closed cross section having a substantial V-shape or a substantial U-shape, and stress concentrated in the folded wall portion can be efficiently relaxed and fatigue properties of a torsion beam can be efficiently improved by processing the folded wall portion to have a thickness thicker than the first wall portion and the second wall portion.

Then, it has been found that when a folded wall portion is processed to be thick, residual stress in the folded wall portion can be reduced and a significant effect can be achieved in preventing metal fatigue from progressing by causing compressive stress along a closed cross section.

In order to solve the problem above, the present invention proposes a method and an apparatus as follows.

(1) According to an aspect of the present invention, there is provided a torsion beam manufacturing method for manufacturing a torsion beam which is provided with a uniformly shaped closed cross-sectional portion in which a cross section orthogonal to a longitudinal direction is a closed cross section having a substantial V-shape or a substantial U-shape with a pair of ear portions, and a shape changing portion which leads to the uniformly shaped closed cross-sectional portion and in which a shape of the closed cross section changes progressively away from the uniformly shaped closed cross-sectional portion, the torsion beam manufacturing method comprising: thickening to form a pair of thickened portions in at least the shape changing portion by pressurizing each of the pair of ear portions from outside against swelling of the pair of ear portions in a state where both outer surfaces of each of the pair of ear portions are supported.

Before the thickening, residual stress is caused in each of portions including the pair of car portions. In the aspect according to the above (1), this residual stress can be eliminated or reduced by pressurizing the pair of ear portions from outside and causing the pair of ear portions to be plastically deformed during the thickening. In the related art, such residual stress has not been able to be eliminated or reduced unless special processing such as hydro-form forming is performed, so that much time and effort have been required. According to the present aspect residual stress can be reduced through simple press working without requiring such time and effort.

(2) In the torsion beam manufacturing method according to the above (1), during the thickening, the pair of ear portions may be pressurized in a state where an inner surface of the closed cross section is supported, excluding the pair of ear portions.

In the case of the above (2), since deformation of a part other than the pair of ear portions can be prevented by supporting the part other than the pair of ear portions, a pressurizing force applied to the pair of ear portions can be concentrated in thickening processing of the pair of ear portions. As a result, residual stress of each of the portions including the pair of ear portions can be more reliably eliminated or reduced.

(3) In the torsion beam manufacturing method according to the above (1) or (2), during the thickening, the pair of ear portions may be pressurized such that a maximum value for a plate thickness in the thickened portion ranges from 1.01 to 1.50 times a plate thickness in a part other than the thickened portion in the same cross section.

(4) According to another aspect of the present invention, there is provided a torsion beam manufacturing apparatus for manufacturing a torsion beam which is provided with a uniformly shaped closed cross-sectional portion in which a cross section orthogonal to a longitudinal direction is a closed cross section having a substantial V-shape or a substantial U-shape with a pair of ear portions, and a shape changing portion which leads to the uniformly shaped closed cross-sectional portion and in which a shape of the closed cross section changes progressively away from the uniformly shaped closed cross-sectional portion, the torsion beam manufacturing apparatus comprising: a first die which supports both outer surfaces of the pair of ear portions; and a second die which pressurizes top portions of the pair of ear portions from outside toward an inside of the closed cross section.

Before thickening processing is performed by the torsion beam manufacturing apparatus of the aspect according to the above (4), residual stress is caused in each of portions including the pair of ear portions. In the present aspect, residual stress can be eliminated or reduced when the second die pressurizes the top portions of the pair of ear portions from outside toward the inside of the closed cross section and causes the pair of ear portions to be plastically deformed in a state where the first die supports both outer surfaces of the pair of ear portions. In the related art, such residual stress has not been able to be eliminated or reduced unless special processing such as hydro-form forming is performed, so that much time and effort have been required. According to the present aspect, residual stress can be reduced through simple press working without requiring such time and effort.

(5) The torsion beam manufacturing apparatus according to (4) may further include a third die which supports an inner surface excluding the pair of ear portions within the closed cross section.

In the case of the above (5), since deformation can be prevented by the third die supporting the part other than the pair of ear portions from the inside, a pressurizing force applied to the pair of ear portions can be concentrated in the thickening processing of the pair of ear portions. As a result, residual stress of each of the portions including the pair of ear portions can be more reliably eliminated or reduced.

(6) According to another aspect of the present invention, there is provided a torsion beam comprising: a uniformly shaped closed cross-sectional portion of which a cross section orthogonal to a longitudinal direction is a closed cross section having a substantial V-shape or a substantial U-shape with a pair of ear portions; and a shape changing portion which leads to the uniformly shaped closed cross-sectional portion and in which a shape of the closed cross section changes progressively away from the uniformly shaped closed cross-sectional portion, wherein each of the pair of ear portions in at least the shape changing portion forms a thickened portion having a plate thickness greater than a plate thickness of a part other than the pair of ear portions, and wherein a residual stress at a thickest position where each of the thickened portions has the greatest plate thickness is equal to or lower than 70% of a tensile strength estimated from Vickers hardness on an outer surface at the same thickest position.

In the pair of ear portions before the thickened portion is formed, residual stress is caused in each of portions including the pair of ear portions. However, the torsion beam of the aspect according to the above (6) is a torsion beam that is manufactured by the torsion beam manufacturing method of the aspect according to the above (1) or the torsion beam manufacturing apparatus of the aspect according to the above (4), and residual stress is eliminated or reduced due to the reasons described above. Then, as a result, residual stress at the thickest position where each of the thickened portions has the greatest plate thickness is equal to or lower than 70% of the tensile strength estimated from the Vickers hardness on the outer surface at the same thickest position.

(7) In the torsion beam according to the above (6), the plate thickness at the thickest position may range from 1.01 to 1.50 times the plate thickness of the part other than the thickened portion in the same cross section.

EFFECTS OF THE INVENTION

According to each of the aspects of the present invention described above, it is possible to provide a torsion beam having excellent fatigue properties. In addition, it is also possible to provide a torsion beam manufacturing method and a torsion beam manufacturing apparatus capable of easily and efficiently manufacturing such a torsion beam.

BRIEF DESCRIPTION OF THE DRAWINGS

FIG. 4 is a perspective view describing a schematic configuration of a longitudinal direction shape changing portion of the same torsion beam.

FIG. 11(A) illustrates a preparation step, FIG. 11(B) illustrates a press working step, and FIG. 11(C) illustrates a torsion beam after processing.

FIG. 12 is a cross-sectional view illustrating residual stress distribution within a torsion beam after processing in the same Example. FIG. 12(A) illustrates Comparative Example in which a thickening step is not performed, and FIGS. 12(B) and 12(C) illustrate Example of the present invention in which the thickening step is performed.

EMBODIMENT OF THE INVENTION

Hereinafter, with reference to the drawings, an embodiment of the present invention will be described.

Figure 1:
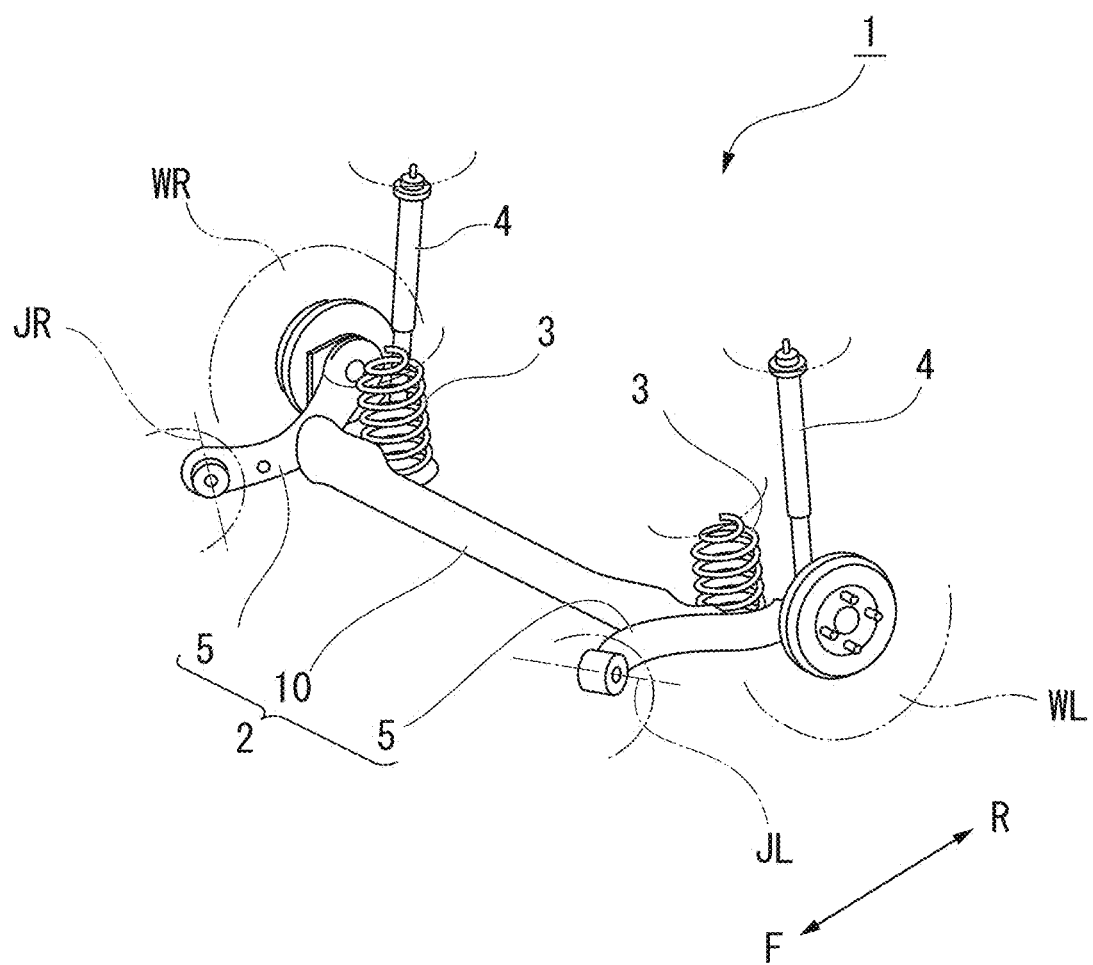
FIG. 1 is a perspective view describing a schematic configuration of a torsion beam-type rear suspension apparatus according to an embodiment of the present invention.

FIG. 1 is a perspective view illustrating a schematic configuration of a torsion beam-type rear suspension apparatus (torsion beam-type suspension apparatus) according to the present embodiment. In FIG. 1, the reference sign 1 indicates a torsion beam-type rear suspension apparatus. The reference sign 2 indicates a torsion beam assembly. The reference sign 10 indicates a torsion beam. The reference sign F illustrated in FIG. 1 indicates the front of a vehicle (not illustrated) in which the torsion beam-type rear suspension apparatus 1 is mounted, and the reference sign R indicates the rear.

As illustrated in FIG. 1, for example, the torsion beam-type rear suspension apparatus 1 includes the torsion beam assembly 2, and springs 3 and absorbers 4 through which the torsion beam assembly 2 and a vehicle body (not illustrated) are coupled to each other.

The torsion beam assembly 2 supports right and left wheels WL and WR using a pair of right and left trailing arms 5 and is coupled to the vehicle body via pivot axes JL and JR extending respectively from the right and the left of the vehicle body slightly forward toward the central side of the vehicle body. Then, the torsion beam assembly 2 is oscillatable with respect to the vehicle body.

Figure 2:
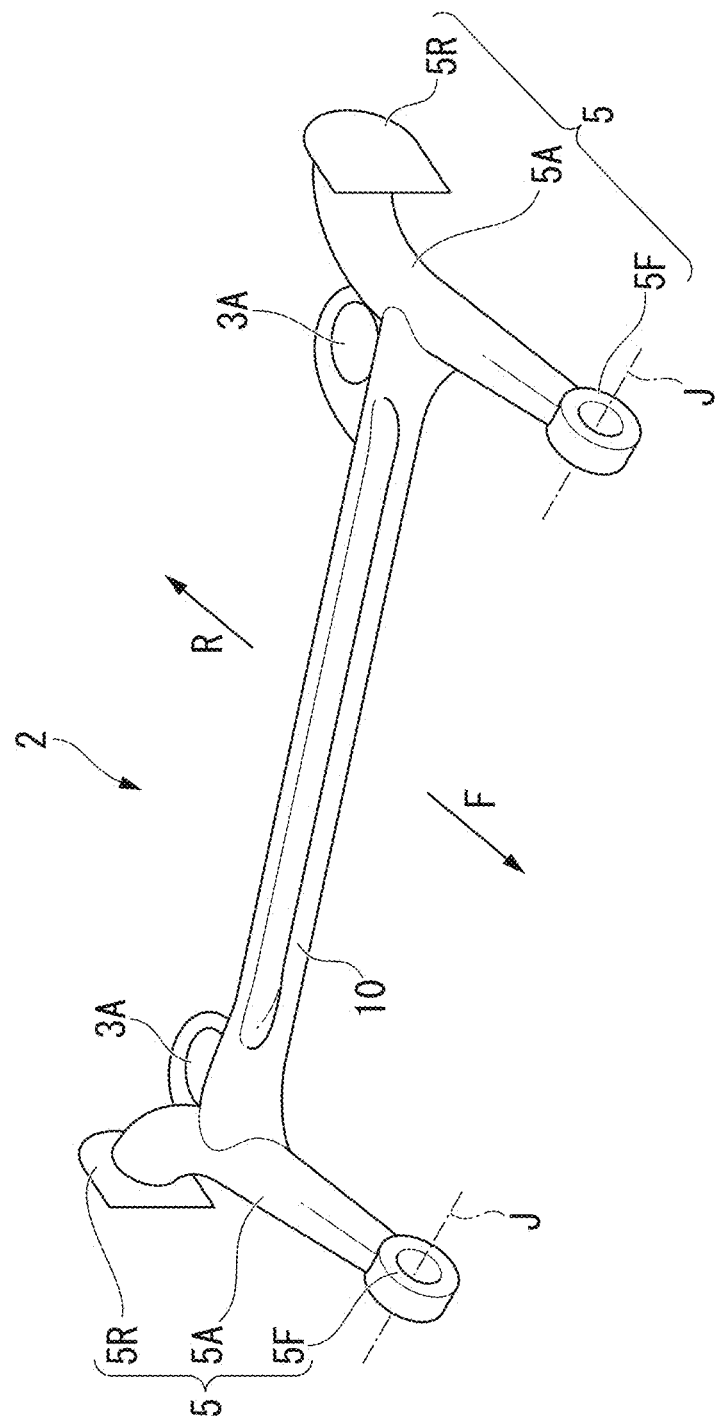
FIG. 2 is a view describing a schematic configuration of a torsion beam assembly according to the same embodiment and is a perspective view seen from below.

As illustrated in FIG. 2, for example, the torsion beam assembly 2 includes the pair of right and left trailing arms (arms) 5, the torsion beam 10 through which the trailing arms 5 are coupled to each other, and a pair of left and right spring receiving portions 3A which respectively support the springs 3. In addition, one end side of the absorbers 4 (cushioning devices) is connected to a cushioning reception portion (not illustrated).

In the present embodiment, as illustrated in FIGS. 1 and 2, the torsion beam 10 has a closed cross-sectional shape of a substantial V-shape projected upward.

As illustrated in FIG. 2, for example, the trailing arms 5 include trailing arm main bodies 5A, pivot attachment members 5F which are respectively connected to front ends of the trailing arm main bodies 5A and are supported by the vehicle body via the pivot axes J, and wheel attachment members 5R which are respectively coupled to rear ends of the trailing arm main bodies 5A and support the wheels WL and WR.

The spring receiving portion 3A is disposed on a side opposite to the pivot attachment member 5F with the torsion beam 10 interposed therebetween. One end side of the spring 3 is attached to the spring receiving portion 3A. A load received from a road surface is transmitted to the vehicle via the wheels WL and WR, the trailing arms 5, and the springs 3.

Hereinafter, with reference to FIGS. 3 to 5B, the torsion beam 10 according to the present embodiment will be described.

Figure 3:
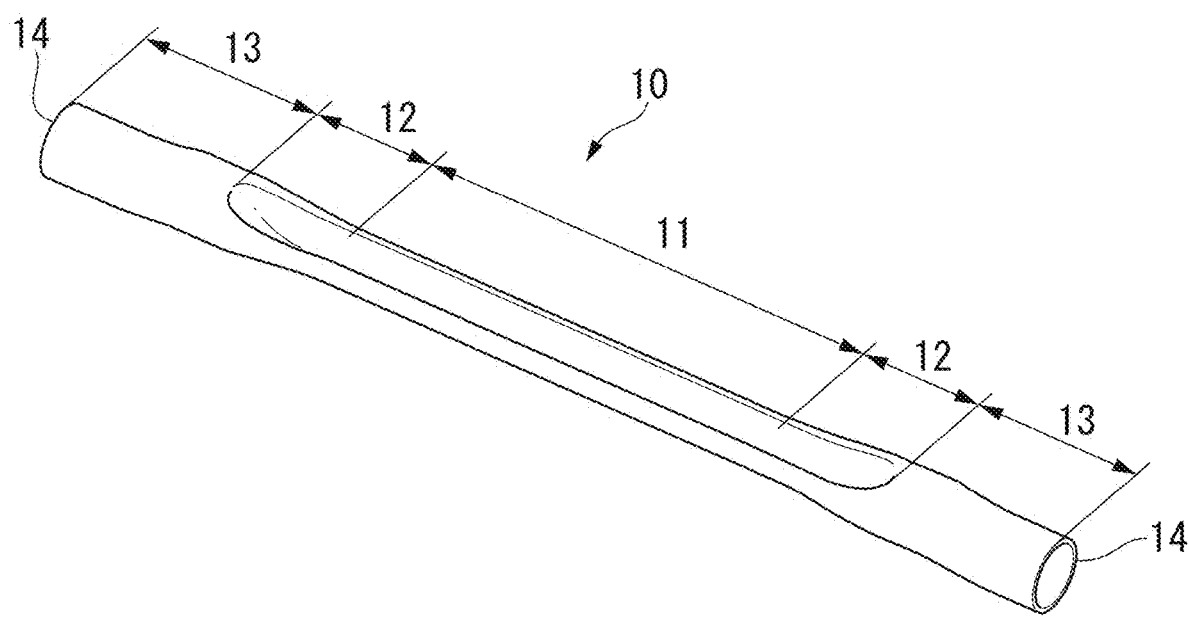
FIG. 3 is a perspective view describing a schematic configuration of a torsion beam according to the same embodiment.
Figure 5A:
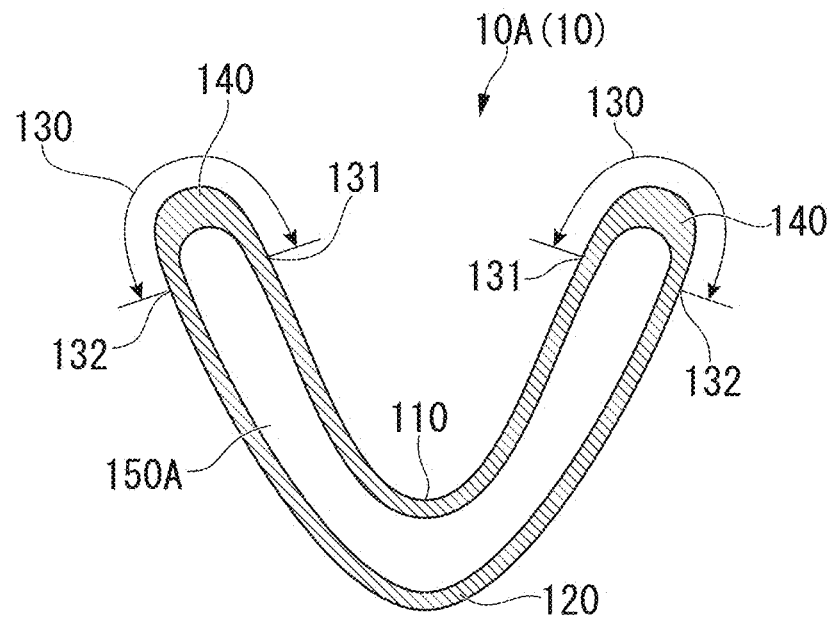
FIG. 5A is a cross-sectional view illustrating a schematic configuration of the same torsion beam and is a closed cross section indicated with arrows VA-VA in FIG. 4.
Figure 5B:
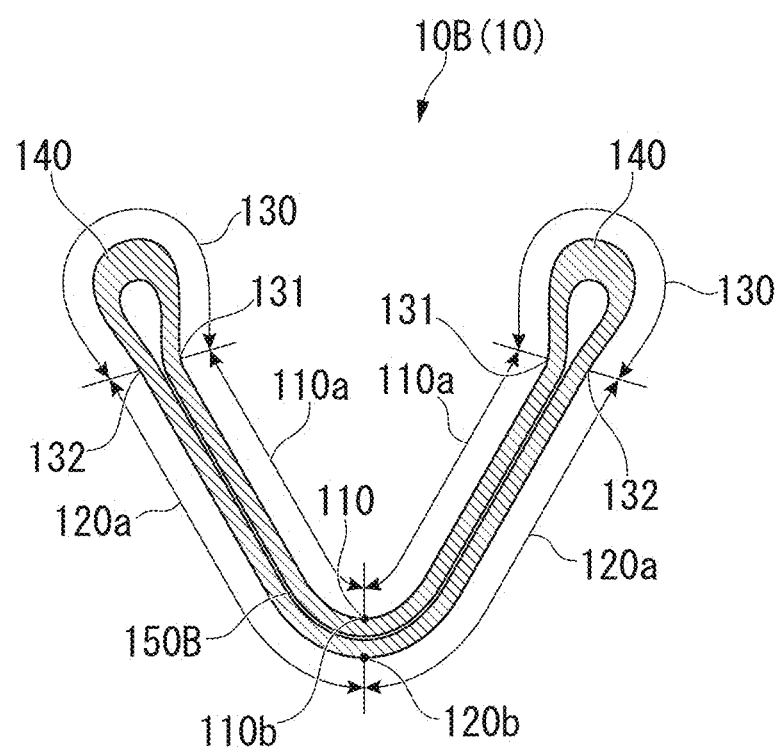
FIG. 5B is a cross-sectional view illustrating a schematic configuration of the same torsion beam and is a closed cross section indicated with arrow is VB-VB in FIG. 4.

FIG. 3 is a perspective view describing a schematic configuration of the torsion beam 10 according to the present embodiment. FIG. 4 is a perspective view describing a portion in the vicinity of a longitudinal direction shape changing portion oldie torsion beam 10. FIGS. 5A and 5B are cross-sectional views of the torsion beam 10. FIG. 5A illustrates a cross section of arrows VA-VA in FIG. 4, and FIG. 5B illustrates a cross section of arrows VB-VB in FIG. 4.

As illustrated in FIGS. 3 and 4, the torsion beam 10 includes a uniformly shaped closed cross-sectional portion 11 which is formed on a central side in a longitudinal direction and has a closed cross section having a substantially uniform V-shape, longitudinal direction shape changing portions 12 attachment closed cross-sectional portions 13, and attachment portions 14 which are formed in outer side end portions of the attachment closed cross-sectional portions 13, which have a substantially elliptic closed cross-sectional shape, and to which the trailing arms 5 are attached.

The uniformly shaped closed cross-sectional portion 11, the longitudinal direction shape changing portions 12, the attachment closed cross-sectional portions 13, and the attachment portions 14 are formed in this order from the center toward both ends of the torsion beam 10 in the longitudinal direction.

As illustrated in FIGS. 3 and 4, the uniformly shaped closed cross-sectional portion 11 is positioned on the central side of the torsion beam 10 in the longitudinal direction and is connected to each of the longitudinal direction shape changing portions 12 at both ends thereof in the longitudinal direction.

The uniformly shaped closed cross-sectional portion 11 is a part in which a substantially uniform closed cross-sectional shape having a substantial V-shape or a substantial U-shape is continuously firmed along the longitudinal direction in a view where the torsion beam 10 is seen in a cross section, perpendicular to the longitudinal direction. The torsion beam 10 of the present embodiment has a symmetric shape in a vehicle body front-rear direction. In the uniformly shaped closed cross-sectional portion 11, unevenness may be partially formed in a valley portion (bottom portion) of a wall portion constituting a recessed side having a substantial V-shape or a substantial U-shape.

As illustrated in FIG. 4, in the longitudinal direction shape changing portion 12, a portion close to the center of the torsion beam 10 in the longitudinal direction is connected to the uniformly shaped closed cross-sectional portion 11, and a portion outward in the longitudinal direction is connected to the attachment closed cross-sectional portion 13.

In addition, in the longitudinal direction shape changing portion 12, a closed cross section orthogonal to the longitudinal direction of the torsion beam 10 gradually changes from the uniformly shaped closed cross-sectional portion 11 toward the attachment closed cross-sectional portion 13. That is, the shape changing portion 12 is a part in which the depth of the valley portion (bottom portion) of the wall portion constituting the recessed side having a substantial V-shape or a substantial U-shape becomes gradually shallow outward in the longitudinal direction (outward in a vehicle width direction). A portion in which the valley portion (bottom portion) becomes shallower may be partially formed in the middle of the shape changing portion 12.

As illustrated in FIG. 5A that is a cross section indicated with arrows VA-VA in FIG. 4, the longitudinal direction shape changing portion 12 includes a first wall portion 110 forming a recessed side outer surface in the closed cross section having a substantial V-shape, a second wall portion 120 forming a projected side outer surface in the same closed cross section, and two folded wall portions 130 (pair of ear portions) respectively forming both end portions of the first wall portion 110 and the second wall portion 120 and swelling outward in a closed cross section. A thickening treatment portion 140 is formed in each of the folded wall portions 130.

Thickening treatment denotes processing of forming a thickening treatment scheduled portion into a portion thicker than both of the first wall portion 110 and the second wall portion 120.

In addition, the folded wall portions 130 are wall portions including both end portions of the first wall portion 110 and the second wall portion 120, swell outward from the inside in a closed cross section having a substantial V-shape or a substantial U-shape, and are positioned between a first wall portion side folded point 131 and a second wall portion side folded point 132.

In this embodiment, the thickening treatment portions 140 are formed across the entire length in the torsion beam 10 excluding the attachment closed cross-sectional portions 13, that is, formed in the uniformly shaped closed cross-sectional portion 11 and the longitudinal direction shape changing portions 12. However, the configuration is not limited to only this form. The thickening treatment portions 140 may be formed in only the shape changing portions 12. The shape changing portions 12 are parts in which the shape changes along the longitudinal direction and which require strength in particular. Therefore, it is elective to form the thickening treatment portions 140 in at least the shape changing portions 12.

When the thickening treatment portions 140 are formed, rolling rigidity increases, compared to a case where the plate thickness is uniform across both the circumferential direction and the entire length of the torsion beam 10. Meanwhile, in vehicle body design, since the rolling rigidity required in the torsion beam 10 is determined to be within a predetermined range, it is not preferable that the rolling rigidity of the torsion beam 10 as an actual product is higher or lower than a design value. Therefore, it is required that the rolling rigidity approximates a predetermined design value and reduction of residual stress is achieved, at the same time. For example, if it is probable that the rolling rigidity deviates from a design value due to forming of a thickened portion, the two conditions described above can be compatible by reducing the diameter (the circumferential length) of the torsion beam 10 in advance at the design stage.

In the longitudinal direction shape changing portion 12, the first wall portion 110 and the second wall portion 120 and are formed so as to be separated from each other, and a hollow portion 150A having a substantial V-shape is formed between the first wall portion 110 and the second wall portion 120.

In addition, the longitudinal direction shape changing portion 12 has a symmetric shape in the vehicle body front-rear direction.

As illustrated in FIG. 5A, the folded wall portion 130 is formed between the first wall portion side folded point 131 and the second wall portion side folded point 132.

For example, the thickening treatment portions 140 are formed across the entire length in a direction along a closed cross section of the two folded wall portions 130. That is, the thickening treatment portion 140 is formed into a shape, such that the plate thickness gradually increases along the closed cross section from the first wall portion side folded point 131 having a plate thickness equal to that of the first wall portion 110 and is maximized at a top portion. Then, the plate thickness gradually decreases along the closed cross section from the top portion. Eventually, the thickening treatment portion 140 reaches the second wall portion side folded point 132 having a plate thickness equal to that of the second wall portion 120.

The maximum thickness (mm) of the thickening treatment portion 140 is 101% to 150% (1.01 to 1.50 times, more preferably 1.05 times to 1.50 limes), for example, with respect to the plate thickness of the first wall portion 110 and the second wall portion 120 (for example, 1.0 mm to 5.0 mm). The thickening treatment portion 140 is gradually thickened toward the thickest part from each of the end portions of the first wall portion 110 and the second wall portion 120.

In regard to measurement of the plate thickness of each of the portions, it is preferable that the maximum thickness is used for the thickening treatment portion 140 and the average value of the thicknesses measured at a plurality of points is used for portions other than the thickening treatment portion 140.

As illustrated in FIG. 5B that is a cross section indicated with arrows VB-VB in FIG. 4, the uniformly shaped closed cross-sectional portion 11 includes the first wall portion 110 forming the recessed side outer surface in the closed cross section having a substantial V-shape, the second wall portion 120 forming the projected side outer surface in the same closed cross section, and the two folded wall portions 130 being respectively connected to both end portions of the first wall portion 110 and the second wall portion 120 and swelling outward. The thickening treatment portion 140 is formed in each of the folded all portions 130.

The first wall portion 110 and the second wall portion 120 are in contact with each other via a close-contact portion 150B.

As illustrated in FIG. 5B, the folded portion 130 is formed between the first all portion side folded point 131 and the second wall portion side folded point 132.

The thickening treatment portions 140 are formed across the entire length in the direction along the closed cross section of the two folded wall portions 130.

The maximum thickness (mm) of the thickening treatment portion 140 is 101% to 150% (1.01 to 1.50 times, more preferably 1.05 times to 1.50 times), for example, with respect to the plate thickness of the first wall portion 110 and the second wall portion 120 (for example, 1.0 mm to 5.0 mm). The thickening treatment portion 140 is gradually thickened toward the thickest part from each of the end portions of the first wall portion 110 and the second wall portion 120.

The attachment closed cross-sectional portion 13 is formed on the outward side of the longitudinal direction shape changing portion 12 in the longitudinal direction of the torsion beam 10, and an outer side end portion serves as the attachment portion 14. The attachment closed cross-sectional portion 13 has a closed cross section having a substantially elliptic shape similar to that of the attachment portion 14. The attachment closed cross-sectional portion 13 denotes a part which is disposed outward in the longitudinal direction of the shape changing portion 12 (outward in the vehicle width direction) and in which a recessed part having a substantial V-shape or a substantial U-shape is not formed.

Figure 6:
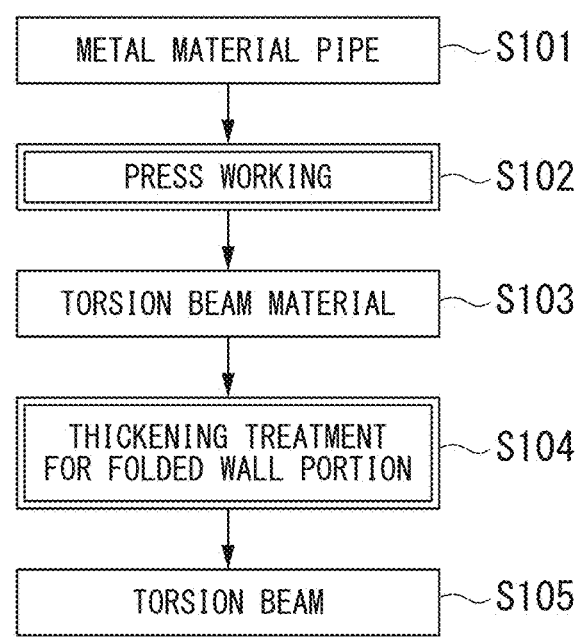
FIG. 6 is a flowchart describing an example of a step for manufacturing a torsion beam according to the same embodiment.

Next, with reference to FIG. 6, an overview of a step for manufacturing the torsion beam 10 according to the present embodiment will be described. FIG. 6 is a flowchart describing the step for manufacturing the torsion beam 10. In FIG. 6, the single framed block indicates an article, and the double framed block indicates a step.

Hereinafter, with reference to FIG. 6, the step for manufacturing the torsion beam 10 will be described.

(1) A metal material pipe is prepared (Step S101).

As a metal material pipe to be prepared, for example, it is possible to use a circular steel pipe having a uniform thickness.

(2) Next, the metal material pipe is subjected to press working (Step S102).

In press working of the metal material pipe, in the outer shape of the torsion beam 10, a part other than the thickening treatment portion 140 is formed into a final shape, and a part corresponding to the thickening treatment portion 140 is formed into a shape as the thickening treatment scheduled portion having a shape displaced outward beyond the outer shape of the torsion beam 10.

(3) A torsion beam material is formed (Step S103) through the press working of the metal material pipe in (2) (Step S102).

(4) Subsequently, thickening treatment of obtaining the thickening treatment portion 140 is performed by pressurizing the thickening treatment scheduled portion of the torsion beam material (Step S104).

(5) A torsion beam 10 is formed (Step S105) through the thickening treatment in (4).

In the torsion beam manufacturing method according to the present embodiment, in Step S104, the thickening step is performed to form the pair of thickened portions in at least the longitudinal direction shape changing portion 12 by pressurizing the top portion of each of the folded wall portions 130 (pair of ear portions) from outside toward the inside against swelling of the folded wall portion 130 in a state where both outer surfaces of each of the folded wall portions 130 are supported.

Residual stress at the time of forming the folded wall portions 130 is caused in each of the folded wall portions 130 before the thickening step. This residual stress is eliminated or reduced by pressurizing the folded wall portions 130 from outside and causing the folded wall portions 130 to be plastically deformed during the thickening step. Compared to other sites, the folded wall portions 130 thickened in this manner are increased in hardness through work hardening. However, the residual stress is reduced, and the plate thickness is also increased.

Particularly, regarding residual stress, in the torsion beam 10 of the present embodiment, the residual stress at the thickest position (top portion) where each of the folded wall portions 130 has the greatest plate thickness is equal to or lower than 70% of tensile strength estimated from Vickers hardness on an outer surface at the same thickest position.

Considering improvement of fatigue strength of the torsion beam 10, since it is effective to particularly eliminate or reduce residual stress in the folded wall portion 130 forming the ear portion, the pair of folded wall portions 130 is pressurized to be thickened in the present embodiment. A pressurizing force at this time is mainly used for thickening the pair of folded wall portions 130. However, the pressurizing force is consequently transmitted to a part other than the folded wall portions 130. More specifically, for example, in FIG. 5B, a compressive force is also applied along a closed cross section to both a part 120a from a bottom portion 120b of the second wall portion 120 forming a V-shape to the second wall portion side folded points 132 on both sides, and a part 110a from a bottom portion 110b of the first wall portion 110 forming a V-shape in the same manner to the first wall portion side folded points 131 on both sides. This compressive force eliminates or reduces residual stress in both the parts 110a and 120a. In this manner, thickening processing of the present embodiment is performed mainly for eliminating or reducing residual stress in the pair of folded wall portions 130. However, secondarily, the residual stress in other parts can also be eliminated or reduced at the same time.

When estimating the tensile strength from the Vickers hardness, it is possible to use a conversion table and an approximate expression (following Expression (1)) between the Vickers hardness and tensile strength, stipulated in SAE J 417 that is a standard of Society of Automotive Engineers (SAE), for example. In this Expression (1), TS indicates the tensile strength of unit MPa, and Hv indicates the Vickers hardness.

$$TS=3.12 \times Hv+16 \qquad \text{Expression (1)}$$

In addition, the residual stress at the thickest position (top portion) where each of the folded wall portions 130 has the greatest plate thickness is obtained by performing an X-ray measurement with respect to the outer surface at the same thickest position. For example, the following apparatus can be favorably used as an instrument used for this X-ray measurement.

Apparatus name: PSPC/MS F-2M, manufactured by RIGAKU Corporation
Characteristic X-ray: CrKα
Scanning method: 2θ- sin 2Ψ method (side inclination method)

In the thickening treatment in Step S104, it is possible to set in any manner whether thickening treatment is performed after a lapse of a predetermined time from when the thickening treatment scheduled portion is formed in Step S102, or thickening treatment is continuously performed immediately after the thickening treatment scheduled portion is formed.

Figure 7A:
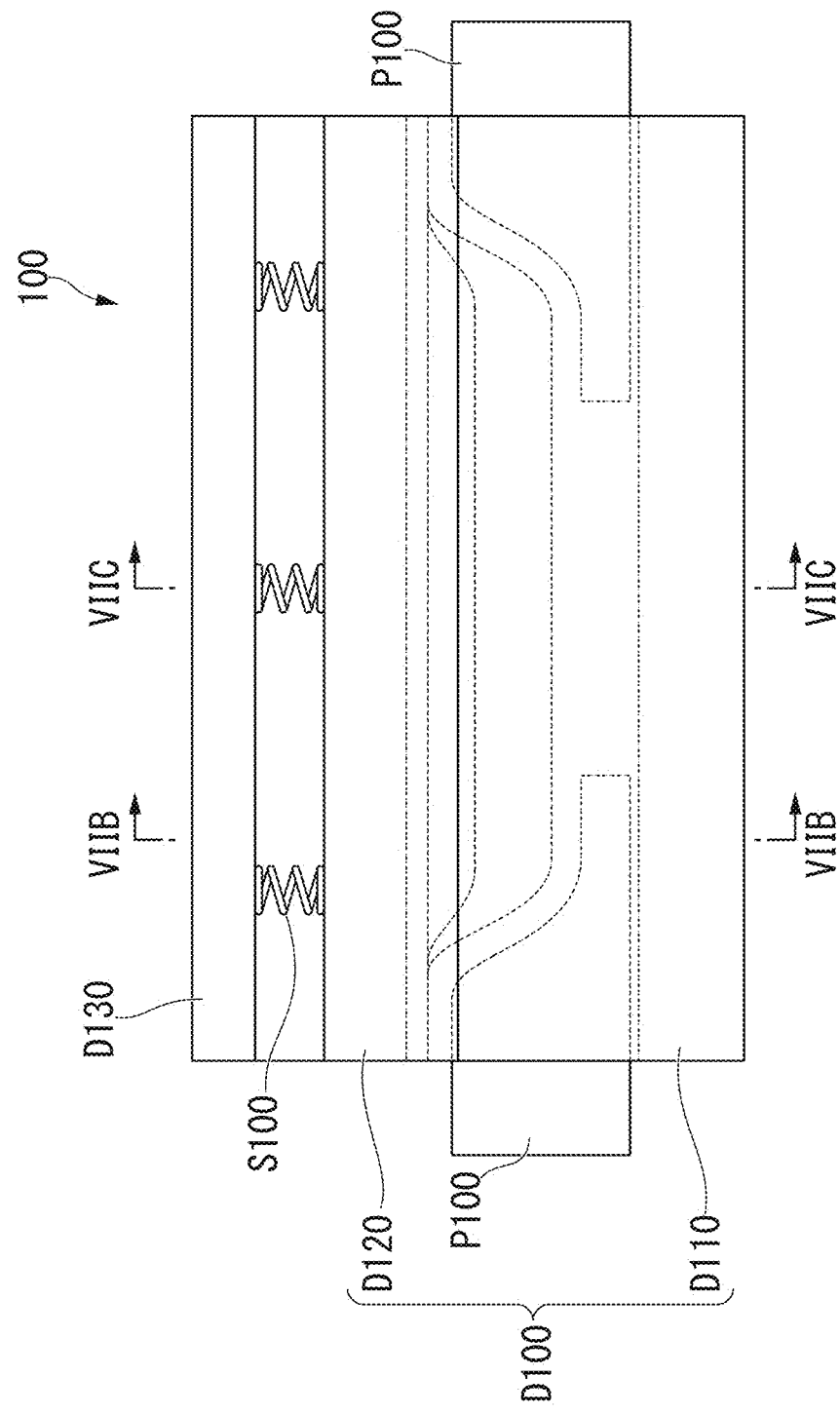
FIG. 7A is a front view describing an example of a torsion beam manufacturing apparatus according to the same embodiment.
Figure 7B:
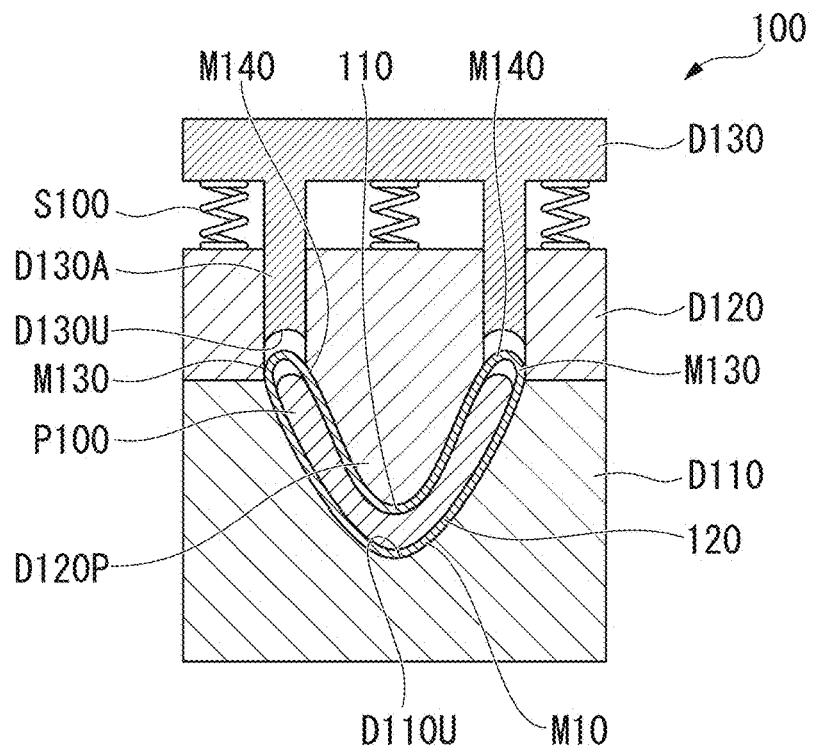
FIG. 7B is a view describing an example of the torsion beam manufacturing apparatus according to the same embodiment and is a cross-sectional view indicated with arrows VIIB-VIIB in FIG. 7A.
Figure 7C:
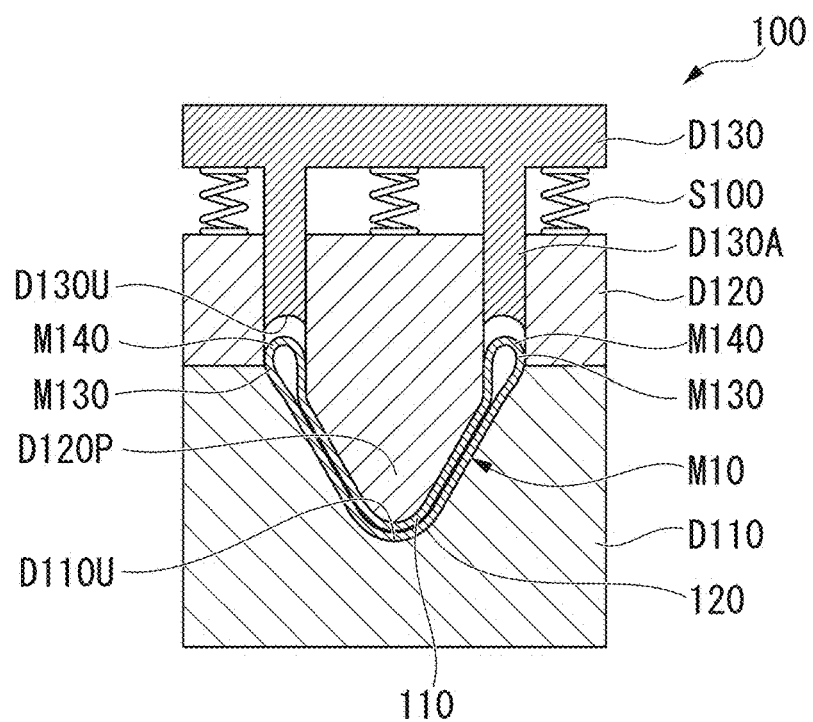
FIG. 7C is a view describing an example of the torsion beam manufacturing apparatus according to the same embodiment and is a cross-sectional view indicated with arrows VIIC-VIIC in FIG. 7A.

Next, with reference to FIGS. 7A to 7C, a schematic configuration of a torsion beam manufacturing apparatus according to the present embodiment will be described. In FIGS. 7A to 7C, the reference sign 100 indicates a torsion beam manufacturing apparatus.

FIG. 7A is a front view describing an example of the torsion beam manufacturing apparatus according to the present embodiment. FIG. 7B is a cross-sectional view of the torsion beam manufacturing apparatus 100 indicated with arrows VIIB-VIIB in FIG. 7A. FIG. 7C is a cross-sectional view of the torsion beam manufacturing apparatus 100 indicated with arrows VIIC-VIIC in FIG. 7A.

For example, as illustrated in FIGS. 7A, 7B, and 7C, the torsion beam manufacturing apparatus 100 includes a lower fixed die (second wall portion supporting die) D110, an upper movable die (first wall portion supporting die) D120, punching dies P100, a thickening treatment pressurizing member D130, and upper movable die pressurizing springs S100.

The lower fixed die D110 also serves as a press forming lower die for forming the second wall portion 120 of a torsion beam material M10 and the torsion beam 10. The upper movable die D120 also serves as a press forming upper die for forming the first wall portion 110 of the torsion beam material M10.

In addition, the lower fixed die D110, the upper movable die D120, and the punching dies P100 constitute a torsion beam material supporting member.

Then, the torsion beam material supporting member supports a portion to be supported of the torsion beam material M10 (for example, a portion which can be supported other than the thickening treatment scheduled portion) and prevents the portion other than the thickening treatment scheduled portion from being deformed when being subjected to thickening treatment.

For example, as illustrated in FIGS. 7B and 7C, the torsion beam material M10 includes the first wall portion 110 forming the recessed side outer surface in a substantially V-shape a closed cross section, the second wall portion 120 forming the projected side outer surface, folded wall portion scheduled portions M130 corresponding to the folded wall portions 130, and thickening treatment scheduled portions M140 each being formed between the folded wall portion scheduled portions M130 and corresponding to the thickening treatment portions 140.

The first wall portion 110 and the second wall portion 120 of the torsion beam material M10 have the same shape as the torsion beam 10.

Meanwhile, the folded wall portion scheduled portion M130 and the thickening treatment scheduled portion M140 of the torsion beam material M10 have a shape different from that of the torsion beam 10.

A second wall portion supporting recessed part D110U is formed in the lower fixed die (second wall portion supporting die) D110. The second wall portion 120 of the torsion beam material M10 is disposed in the second wall portion supporting recessed part D110U, and the second wall portion 120 side of the torsion beam material M10 is supported from below.

A first wall portion supporting pressurization portion D120P is formed in the upper movable die (first wall portion supporting die) D120. The first wall portion supporting pressurization portion D120P pressurizes and supports the first wall portion 110 of the torsion beam material M10 from above.

The punching dies P100 can be inserted into the attachment closed cross-sectional portions 13 and the longitudinal direction shape changing portions 12 of the torsion beam material M10 through both end opening portions (attachment portions 14) of the torsion beam material M10 and support each of the portions of the torsion beam material M10 from the inside.

The thickening treatment pressurizing member D130 includes guide portions D130A and thickening treatment portion forming recessed parts D130U.

The thickening treatment pressurizing member D130 pressurizes the thickening treatment scheduled portions M140 of the torsion beam material M10 supported by the lower fixed die D110, the upper movable die D120, and the punching dies P100 (torsion beam material supporting members), from outside toward the inside.

The upper movable die push-up spring S100 is mounted between the thickening treatment pressurizing member D130 and the upper movable die (first wall portion supporting die) D120. When the thickening treatment pressurizing member D130 is pressurized by a press driving unit (not illustrated), the upper movable die push-up spring S100 pressurizes and supports the first wall portion 110 of the torsion beam material M10 while being gradually compressed by the first wall portion supporting pressurization portion D120P.

Then, when the press driving unit pressurizes the thickening treatment pressurizing member D130 with a greater pressurizing force, the thickening treatment scheduled portions M140 are pressurized, and then the thickening treatment scheduled portions M140 are subjected to thickening treatment.

Then, when the press driving unit raises the thickening treatment pressurizing member D130, the upper movable die push-up spring S100 are stretched, and the thickening treatment pressurizing member D130 is separated from the upper movable die (first wall portion supporting die) D120.

Next, with reference to FIGS. 8A to 8D, processing of portions at the positions in FIG. 7B when the torsion beam material M10 is formed into the torsion beam 10 by using the torsion beam manufacturing apparatus 100 will be described.

Figure 8A:
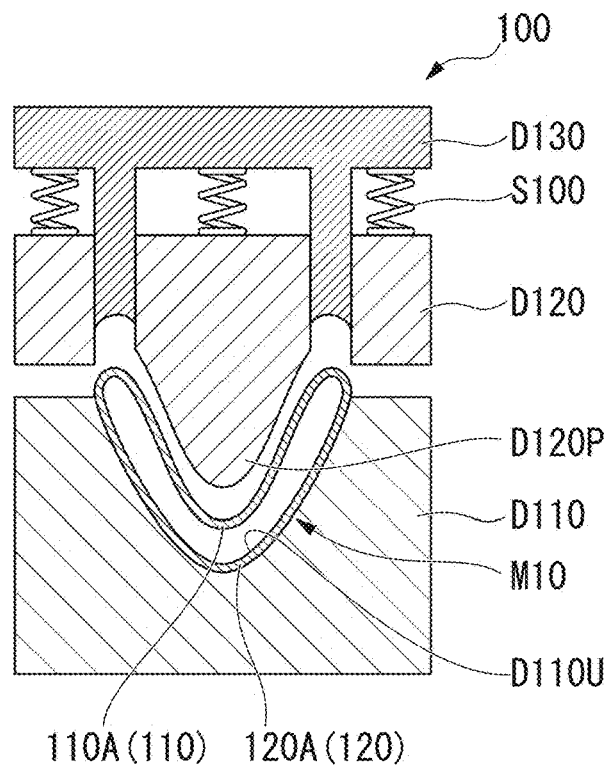
FIG. 8A is a view describing an example of the step for manufacturing a torsion beam according to the same embodiment in regard to the position in FIG. 7B, and is a cross-sectional view illustrating a state where a torsion beam material is disposed in a lower fixed die.

(1) First, as illustrated in FIG. 8A, the torsion beam material M10 is disposed inside the second wall portion supporting recessed part D110U of the lower fixed die D110, and the second wall portion 120 is supported from below thereof.

Figure 8B:
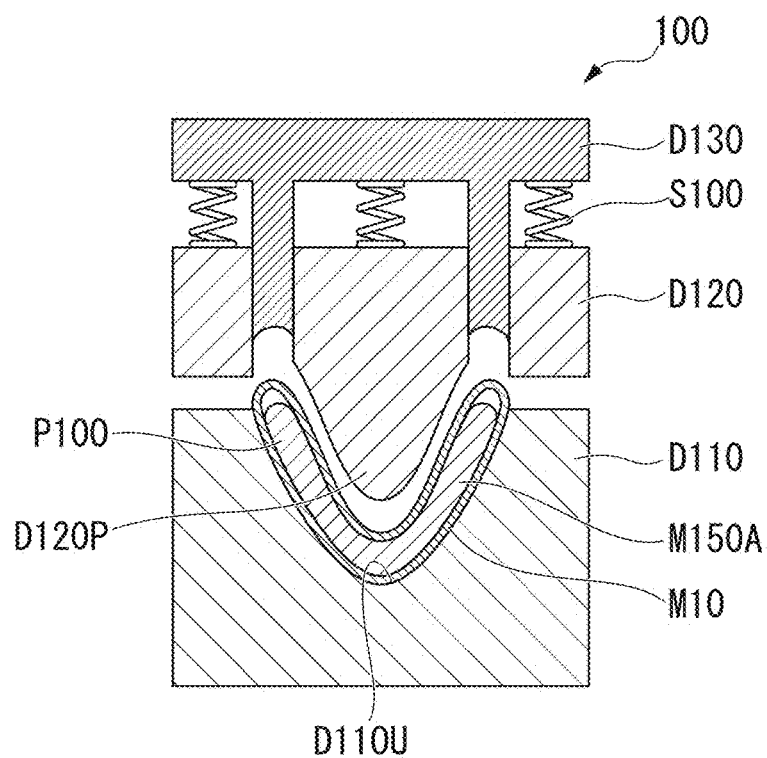
FIG. 8B is a view describing an example of the step for manufacturing a torsion beam according to the same embodiment in regard to the position in FIG. 7B, and is a cross-sectional view illustrating a state where a punching die is inserted into the torsion beam material set in the lower fixed die.

(2) Next, as illustrated in FIG. 8B, the punching dies P100 are inserted into a hollow portion M150A through both end portions of the torsion beam material M10 set in the lower fixed die D110, and the torsion beam material M10 is supported from the inside of the first wall portion 110 and the second wall portion 120.

Figure 8C:
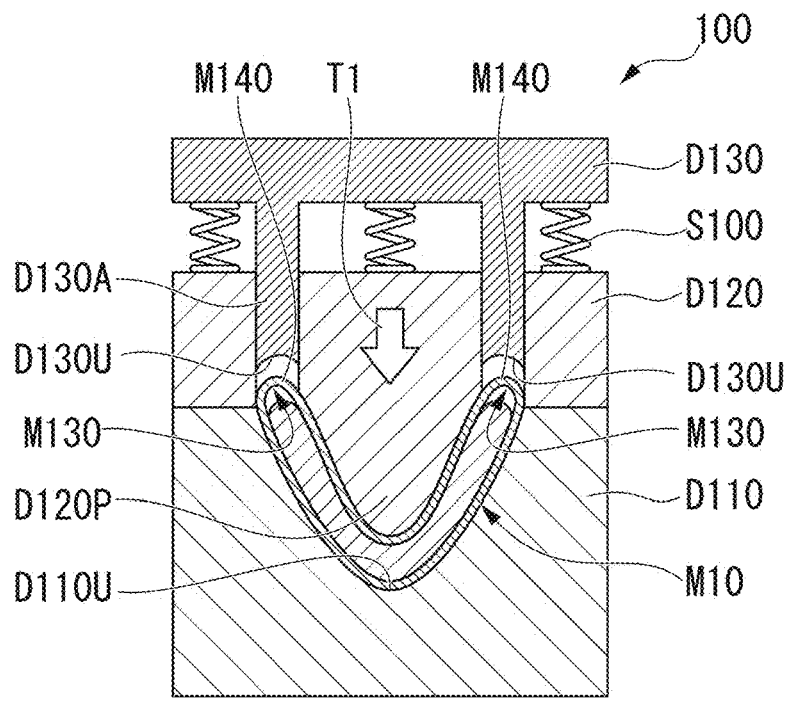
FIG. 8C is a view describing an example of the step for manufacturing a torsion beam according to the same embodiment in regard to the position in FIG. 7B, and is a cross-sectional view illustrating a state where the torsion beam material set in the lower fixed die is pressurized by an upper movable die.

(3) Subsequently, as illustrated in FIG. 8C, the upper movable die D120 is lowered in an arrow T1 direction by the press driving unit. Then, the first wall portion supporting pressurization portion D120P pressurizes and supports the first wall portion 110 of the torsion beam material M10 from above.

As a result, the portion other than the thickening treatment scheduled portions M140 of the torsion beam material M10 is supported (restricted).

Figure 8D:
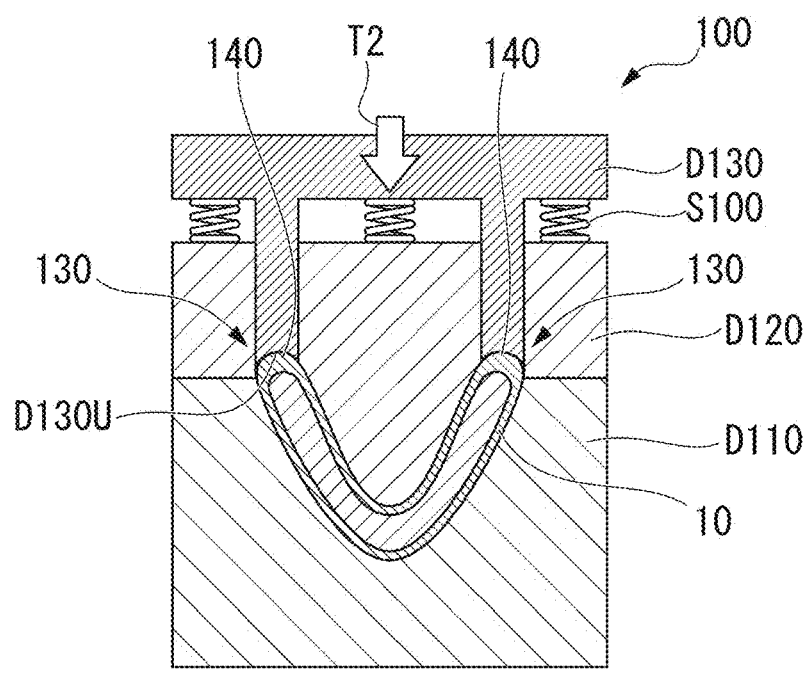
FIG. 8D is a view describing an example of the step for manufacturing a torsion beam according to the same embodiment in regard to the position in FIG. 7B, and is a cross-sectional view illustrating a state where folded wall portions (ear portions) of the torsion beam material restricted by the upper movable die, the lower fixed die, and the punching die are pressurized.

(4) Next, as illustrated in FIG. 8D, the thickening treatment pressurizing member D130 pressurizes the torsion beam material M10 restricted by the lower fixed die D110, the upper movable die D120, and the punching dies P100.

As a result, the thickening treatment scheduled portions M140 are pressurized by the thickening treatment portion forming recessed parts D130U, are plastically deformed, and are subjected to thickening treatment. Then, the thickening treatment portions 140 are formed.

Next, with reference to FIGS. 9A to 9C, processing of portions at the positions in FIG. 7C when the torsion beam material M10 is formed into the torsion beam 10 by using the torsion beam manufacturing apparatus 100 will be described.

The following step is basically performed at the same time as the step described by using FIGS. 8A to 8D but may be separately performed instead of being performed at the same time.

Figure 9A:
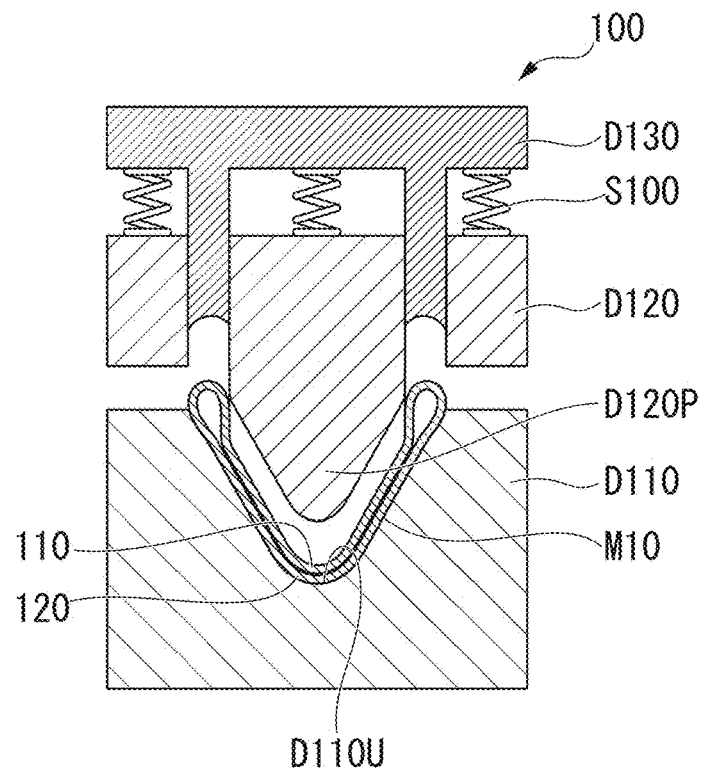
FIG. 9A is a view describing an example of the step for manufacturing a torsion beam according to the same embodiment in regard to the position in FIG. 7C, and is a cross-sectional view illustrating a state where a torsion beam material is disposed in the lower fixed die.

(1) First, as illustrated in FIG. 9A, the torsion beam material M10 is disposed inside the second wall portion supporting recessed part D110U of the lower fixed die D110, and the second wall portion 120 is supported from below thereof.

Figure 9B:
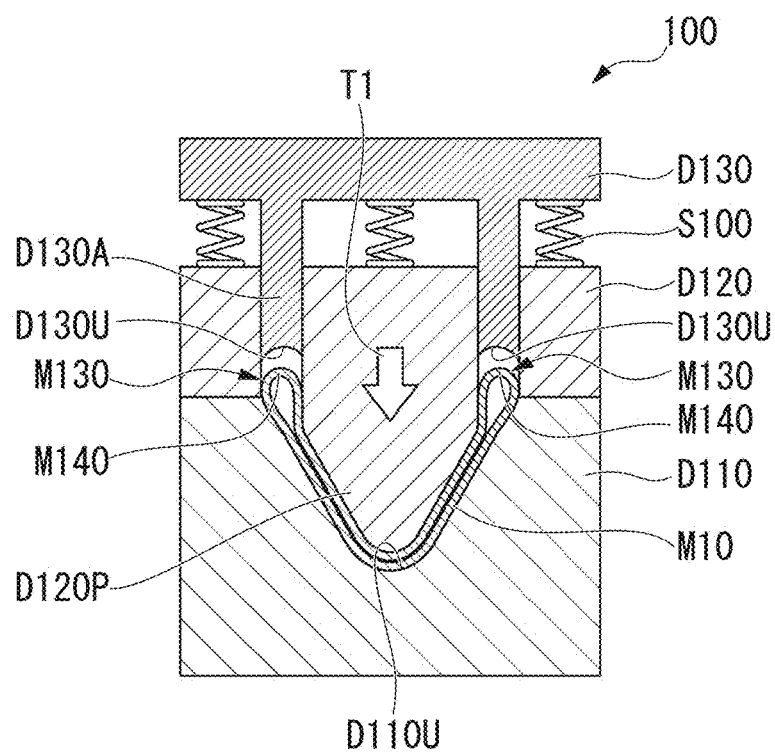
FIG. 9B is a view describing an example of the step for manufacturing a torsion beam according to the same embodiment in regard to the position in FIG. 7C, and is a cross-sectional view illustrating a state where the torsion beam material set in the lower fixed die is pressurized by the upper movable die.

(2) Next, as illustrated in FIG. 9B, the upper movable die D120 is lowered in the arrow T1 direction by the press driving unit (not illustrated). Then, the first wall portion supporting pressurization portion D120P pressurizes and supports the first wall portion 110 of the torsion beam material M10 from above.

As a result, the portion other than the thickening treatment scheduled portions M140 of the torsion beam material M10 is supported (restricted).

Figure 9C:
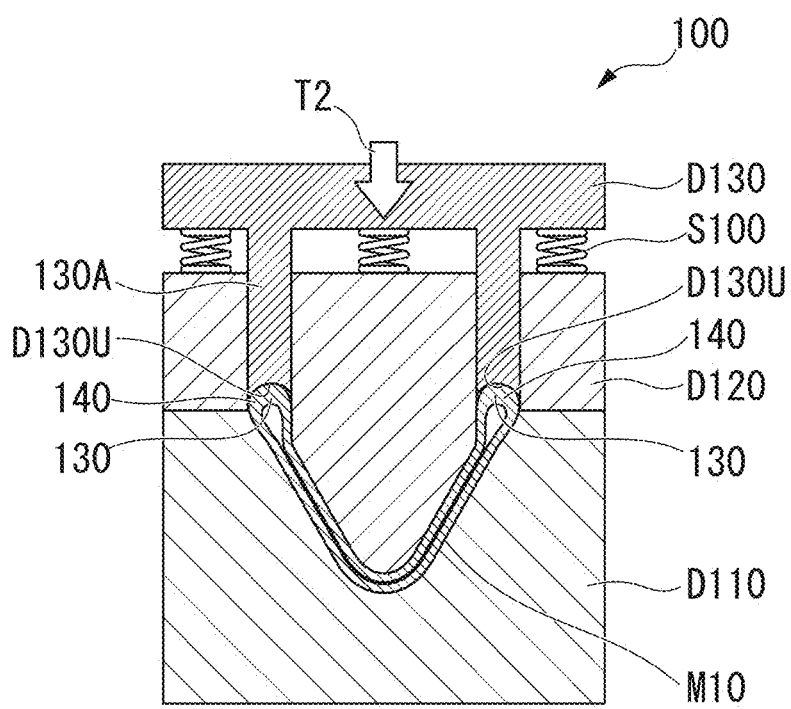
FIG. 9C is a view describing an example of the step for manufacturing a torsion beam according to the same embodiment in regard to the position in FIG. 7C, and is a cross-sectional view illustrating a state where the folded wall portions (ear portions) of the torsion beam material restricted by the upper movable die and the lower fixed die are pressurized.

(3) Subsequently, as illustrated in FIG. 9C, the thickening treatment pressurizing member D130 pressurizes the torsion beam material M10 restricted by the lower fixed the D110 and the upper movable the D120.

As a result, the thickening treatment scheduled portions M140 are pressurized by the thickening treatment portion forming recessed parts D130U, are plastically deformed, and are subjected to thickening treatment. Then, the thickening treatment portions 140 are formed.

Next, with reference to FIGS. 10A to 10C, an operation when the thickening treatment scheduled portions M140 are subjected to thickening treatment will be described.

Figure 10A:
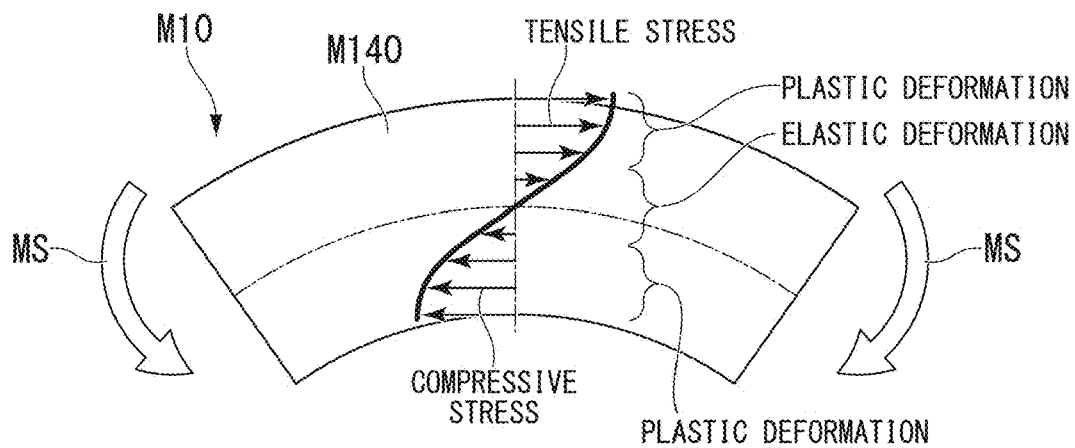
FIG. 10A is a view illustrating stress generated in a thickening treatment scheduled portion when a torsion beam material is formed during a process of manufacturing a torsion beam according to the same embodiment.

(1) First, as illustrated in FIG. 10A, if a metal material pipe is plastically deformed when the torsion beam material M10 is formed, tensile stress is applied to the outward side of the thickening treatment scheduled portions M140 due to an applied bending moment MS. Meanwhile, compressive stress is applied to the inward side of the thickening treatment scheduled portions M140. As a result, plastic deformation is caused outward in a thickness direction (outer surface and inner surface), and elastic deformation is caused inward in the thickness direction (central part).

Thereafter, when the bending moment MS is removed by stopping the press, the deformed thickening treatment scheduled portions M140 are restored based on elastic deformation. Ultimately, the difference obtained by subtracting a stress change at the time of restoring deformation caused due to elastic deformation from stress distribution of elastic deformation and plastic deformation before restoration remains as residual stress.

Figure 10B:
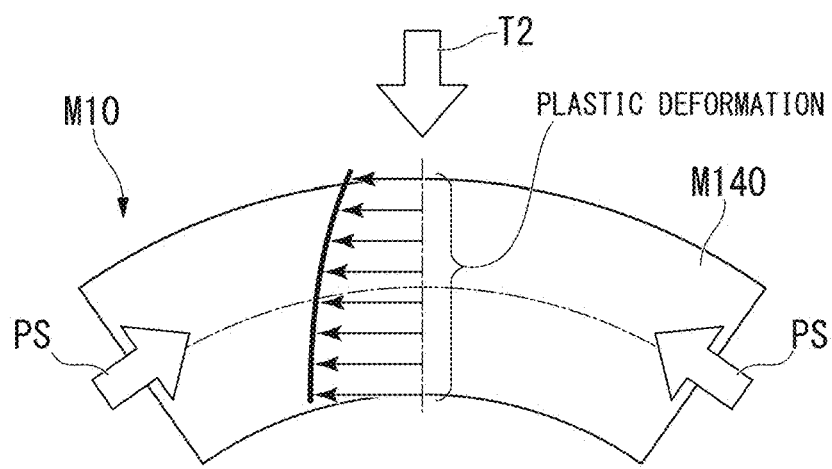
FIG. 10B is a view illustrating stress generated when the thickening treatment scheduled portion is subjected to thickening treatment during the process of manufacturing a torsion beam according to the same embodiment.
Figure 10C:
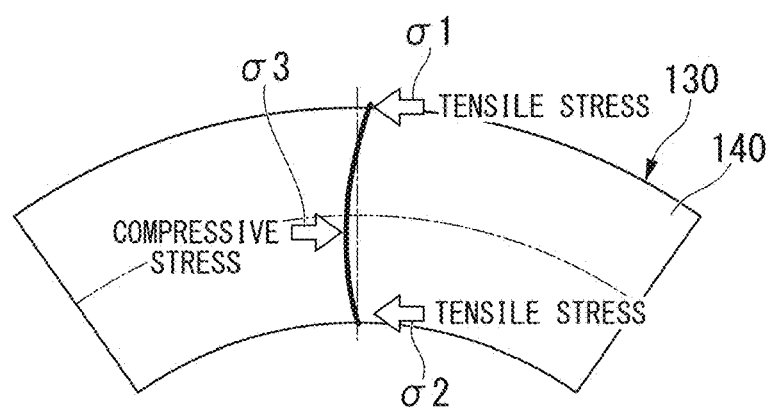
FIG. 10C is a view illustrating residual stress in a thickening treatment portion during the process of manufacturing a torsion beam according to the same embodiment.

(2) Next, as illustrated in FIG. 10B, when the thickening treatment scheduled portions M140 are pressurized in an arrow T2 direction and thickening treatment for plastically deforming the thickening treatment scheduled portions M140 is performed, a compressive force PS acts and compressive stress is caused in the thickening treatment scheduled portions M140 in their entirety. Therefore, both bent outward side and inward side are in a compressive stress state. In addition, the entire region becomes a plastic region, so that a change in the stress value in the thickness direction is reduced. As a result, the bending moment MS in the plate thickness direction decreases extremely, and the restoration quantity caused due to elastic deformation when the compressive force PS is removed also decreases extremely, so that ultimate residual stress is extremely reduced as well.

As described above, residual stress in the folded wall portions 130 is reduced, and fatigue strength is improved.

According to the torsion beam manufacturing method using the torsion beam manufacturing apparatus 100 of the present embodiment, the supporting site set in advance in the torsion beam material M10 is supported and the thickening treatment scheduled portion is subjected to thickening treatment, so that the torsion beam 10 having excellent fatigue properties in the folded wall portions 130 can be efficiently manufactured. The expression "efficiently manufactured" denotes that residual stress can be reduced through only mechanical cold forming without complicated forming processing using liquid pressure as in the related art. In addition, the expression "the supporting site set in advance" in the torsion beam material M10 denotes a site other than the thickening treatment scheduled portion, which is supported (restricted) when the thickening treatment scheduled portion of the torsion beam material M10 is subjected to thickening treatment.

In addition, the thickening treatment pressurizing member D130 pressurizes the thickening treatment scheduled portions M140 inward from outside the closed cross section and thickening treatment is performed this the thickening treatment scheduled portions M140 are compressed along the closed cross section. Therefore, a torsion beam having excellent fatigue properties can be efficiently manufactured.

According to the torsion beam manufacturing method using the torsion beam manufacturing apparatus 100 of the present embodiment, the torsion beam material M10 is supported (restricted) by the lower fixed die D110 supporting the second wall portion side 120 of the torsion beam material M10, the upper movable die D120 supporting the first wall portion 110 side of the torsion beam material M10, and the punching dies P100 supporting the first wall portion 110 and the second wall portion 120 of the torsion beam material M10 from the inside, and the thickening treatment scheduled portions M140 are pressurized b the thickening treatment pressurizing member D130. Therefore, the thickening treatment portions 140 can be easily and efficiently formed in the folded wall portions 130 with a simple configuration and a simple step.

According to the torsion beam manufacturing method using the torsion beam manufacturing apparatus 100 of the present embodiment, the hollow portion 150A is supported by the punching dies P100 from the inside. Therefore, the thickening treatment portions 140 can be reliably subjected to thickening treatment without causing the hollow portion 150A to be deformed.

As a result, the longitudinal direction shape changing portions 12, the attachment closed cross-sectional portions 13, and the attachment portions 14 of the torsion beam 10 can be stably and efficiently subjected to thickening treatment.

According to the torsion beam manufacturing method of the present embodiment, the metal material pipe is subjected to deformation processing and the torsion beam material M10 is formed. Therefore, the torsion beam material M10 can be efficiently formed.

As a result, the torsion beam 10 having excellent fatigue properties can be efficiently manufactured.

The present invention is not limited to only the embodiment described above and various changes can be made within a range not departing from the gist of the present invention.

For example, in the embodiment described above, a case where the torsion beam 10 is formed into a substantial V-shape projected upward in a case of being mounted in a vehicle body has been described. However, the embodiment may be applied to a torsion beam formed into a substantial U-shape or may be configured to be projected downward with respect to a vehicle body.

In addition, in the embodiment described above, a case where the thickening treatment portions 140 are formed in both the folded wall portions 130 on the front side and the rear side of a vehicle body in the torsion beam 10 has been described. However, the embodiment can also be applied to the torsion beam 10 in which the thickening treatment portion 140 is formed in any one of the folded wall portions 130 on the front side and the rear side of a vehicle body.

In addition, in the embodiment described above, a case where the thickening treatment portions 140 are formed across the entire length of the uniformly shaped closed cross-sectional portion 11 and the longitudinal direction shape changing portions 12 has been described. However, the thickening treatment portions 140 may be formed within any range in the longitudinal direction of the torsion beam 10.

In addition, in the embodiment described above, a case where the thickening treatment portions 140 are formed across the entire range in a direction along a closed cross section of the folded wall portions 130 has been described. However, a range of forming the thickening treatment portions 140 in the direction along the closed cross section can be set in any manner, and the thickening treatment portion 140 may be formed in a part of the folded wall portions 130.

In addition, the thickening treatment portions 140 may be formed within a range exceeding, the folded wall portions 130 in the direction along the closed cross section.

In addition, in the embodiment described above, a case where the inward sides of the first wall portion 110 and the second wall portion 120 constituting the uniformly shaped closed cross-sectional portion 11 in a closed cross section are formed to be in tight contact with each other has been described. However, for example, when the thickening treatment portions 140 are subjected to thickening treatment, in a case where unspecific deformation can be prevented from being caused due to thickening treatment in sites of the folded wall portions 130, the first wall portion 110, and the site adjacent to the thickening treatment portions 140 of the second wall portion 120, or in a case where thickening treatment causes no influence, whether or not the insides of the first wall portion 110 and the second wall portion 120 are to be in tight contact with each other can be set in any manner.

In addition, in the embodiment described above, a case where the thickness of the thickening treatment portions 140 gradually changes in the direction along the closed cross section has been described. However, for example, the shape of a change in thickness of the thickening treatment portions 140 may be set in any manner by adjusting the shape of the pressurizing portion D130U of the thickening treatment pressurizing member D130.

In addition, in the embodiment described above, a case where the torsion beam manufacturing apparatus 100 includes the lower fixed die (second wall portion supporting die) D110, the upper movable die (first wall portion supporting die) D120, the punching dies P100, the thickening treatment pressurizing member D130, and the upper movable die pressurizing springs S100 has been described. However, whether or not to include the punching dies P100 can be set in any manner.

In addition, in place of the upper movable die pressurizing springs S100, the thickening treatment pressurizing member D130 may be configured to be lowered in a delayed manner with respect to the upper movable die D120 by using an actuator such as a hydraulic, cylinder, a cam, or a combination thereof.

In the embodiment described above, a case of performing thickening treatment in which the torsion beam material M10 is formed in advance through press working, the supporting site of the torsion beam material M10 is supported by the lower fixed die D110 and the upper movable die D120, the upper movable die pressurizing springs S100 are compressed, and then the thickening treatment pressurizing member D130 pressurizes the thickening treatment scheduled portions M140 has been described. However, in place of the upper movable die pressurizing springs S100, for example, the embodiment may be configured to start thickening treatment at the same time as the torsion beam material M10 is formed and the supporting site of the torsion beam material M10 is supported, by applying an actuator such as a hydraulic cylinder, a cam mechanism, or the like.

In addition, press working (Step S102) and processing of thickening, the folded wall portion (Step S104) may be performed practically in one step by configuring the upper movable die D120 and the thickening treatment pressurizing member D130 to be able to be pressurized by a hydraulic cylinder or the like.

That is, the upper movable die D120 may be connected to a hydraulic cylinder or the like baying a pressurizing force enabling press working (Step S102), the thickening treatment pressurizing member D130 may be connected to a hydraulic cylinder or the like having a pressurizing force enabling thickening of the folded wall portion (Step S104), and the thickening treatment pressurizing member D130 may be interlocked with the upper movable die D120. Accordingly, the torsion beam 10 may be practically manufactured in one step (station), after the upper movable die D120 performs press working (Step S102) for obtaining the torsion beam material M10 from the metal material pipe, and thickening treatment for the folded wall portion is continuously performed (Step S104).

In addition, in the embodiment described above, a case where the second wall portion supporting die and the first wall portion supporting die are constituted of the lower fixed die D110 and the upper movable die D120 has been described. However, a die moving direction in thickening treatment can be set in any manner.

In addition, in the embodiment described above, a case where the torsion beam material supporting member is constituted of the lower fixed die (second wall portion supporting die) D110, the upper movable die (first wall portion supporting die) D120, and the punching dies P100 has been described. However, for example, the torsion beam material supporting member may be other than dies, such as a chuck device and a clamp which can support the supporting site.

In this embodiment, a case where the lower fixed die D110 and the upper movable die D120 also serve as press forming dies for forming the second wall portion 120 and the first wall portion 110 of the torsion beam material M10 has been described. However, whether the torsion beam material supporting member is configured to be integrated with or to be separated from the press forming dies can be set in any manner.

In addition, in the embodiment described above, a case where a metal material pipe used for forming the torsion beam material M10 is a rounded steel pipe having a uniform thickness has been described. However, for example, the torsion beam material M10 may be formed by using: a metal pipe formed through deformation processing using a welded pipe formed of a steel sheet (metal material sheet) in which a fatigue relaxation thickness shape corresponding portion is formed, through press forming or roll forming; or a metal pipe formed through extrusion forming or drawing forming.

In addition, in the embodiment described above, a case where the metal material pipe used for manufacturing the torsion beam 10 is a steel pipe has been described. However, the embodiment may be applied to any one other than a steel pipe.

EXAMPLE 1

In order to verify an effect of the torsion beam manufacturing method according to the present invention, numerical analysis was performed by using a torsion beam of a quarter-sized model. In this numerical analysis, a case where a circular steel pipe having a strength level of 780 MPa was used as a raw pipe and the raw pipe was seen by being divided into four in a plan view in a state where the raw pipe was subjected to press forming was analyzed. As the size of a raw pipe, a raw pipe of Comparative Example subjected to press forming had an outer diameter of 89.1 mm and a thickness of 2.9 mm, and a raw pipe to which the torsion beam manufacturing method of Example of the present invention was applied had an outer diameter of 90 mm and a thickness of 2.9 mm.

Figure 11:
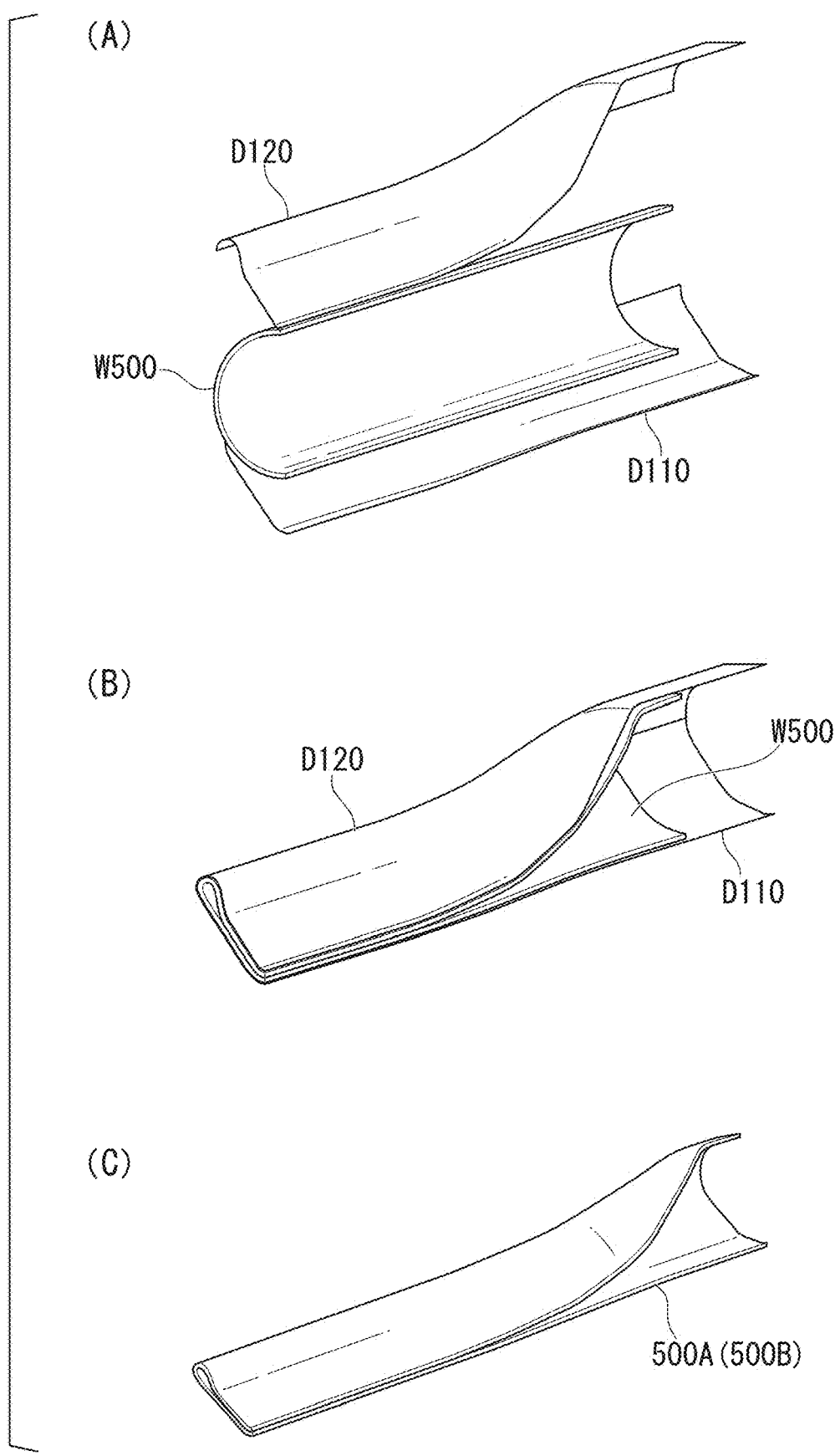
FIG. 11 is a perspective view illustrating Example used in analysis for verifying effects of the present invention.

As illustrated in FIG. 11(A), first, a raw pipe W500 was disposed between the lower fixed die D110 and the upper movable die D120 (which will hereinafter be referred to as a preparation step). In FIGS. 11(A) to 11(C), in the lower fixed die D110 and the upper movable die D120, only a pressurization surface is illustrated.

Subsequently, as illustrated in FIG. 11(B), the upper movable die D120 was lowered and press working of the raw pipe W500 was performed between the upper movable die D120 and the lower fixed die D110 (which will hereinafter be referred to as a press working step). In the manufacturing method of Comparative Example, since the product shape was settled in this step, a torsion beam 500A was completed without any change by releasing the dies as the next step. Meanwhile, in the case of applying the manufacturing method of Example of the present invention, in addition to the press working step, as illustrated in FIGS. 7A to 9C, a thickening step using the thickening treatment pressurizing member D130 was performed, and a torsion beam 500B was completed by releasing the dies. In the same thickening step, the ear portions were subjected to squashing processing in the height direction by 1 mm, that is, squeezing processing was performed to reduce the ear portions in a direction along the curved surface thereof by approximately 2 mm. In this case, an amount of applied strain became approximately 5%.

In FIG. 11(B), illustration of the thickening treatment pressurizing member D130 is omitted.

In the case of applying the manufacturing method of Example of the present invention, the preparation step corresponded to Step S101 in FIG. 6, and the press working step corresponded to Steps S102 and S103, and the thickening step corresponded to Step S104.

FIG. 12(A) illustrates the torsion beam 500A of Comparative Example obtained through each of the steps described above, and FIG. 12(B) illustrates the torsion beam 500B according to Example of the present invention. In FIGS. 12(A) and 12(B), the darker the color part, the higher the residual stress.

In the torsion beam 500A of Comparative Example illustrated in FIG. 12(A), strong residual stress remained uniformly over substantially the entire region on the inner surface of the closed cross section. That is, a tensile force acted on the inner surface of the closed cross section. On the other hand, a compressive force acted on the outer surface of the closed cross section. As a result, residual stress of approximately 900 MPa at the maximum remained.

Meanwhile, in the torsion beam 500B of Example of the present invention illustrated in FIG. 12(B), a significant tensile force or a significant compressive force was not caused on the inner surface and the outer surface of the closed cross section. As a result, residual stress on the inner surfaces of the ear portions was reduced to 100 MPa or lower. Residual stress on the outer surfaces of the car portions was reduced to approximately 200 MPa at the maximum. Moreover, in addition to the pair of ear portions, residual stress in other parts was also reduced at the same time.

As described above, in the torsion beam 500B of Example of the present invention, it was verified that residual stress can be effectively reduced compared to the torsion beam 500A of Comparative Example.

EXAMPLE 2

For verifying an effect of the torsion beam manufacturing method according to the present invention, Example 2 in a case where conditions of the thickening step are changed will be described. In the following description, the difference with respect to Example 1 will be mainly described. Since other configurations are similar to those of Example 1, description thereof will be omitted.

In the thickening step of this Example 2, the ear portions were subjected to squashing processing in the height direction by 3 mm, that is, squeezing processing was performed to reduce the ear portions in the direction along the curved surface thereof by approximately 6 mm. In this case, an amount of applied strain became approximately 15%.

FIG. 12(C) illustrates a torsion beam 600B according to Example of the present invention obtained through such a thickening step. In the torsion beam 600B of Example of the present invention as well, a significant tensile force or a significant compressive force was not remained in the pair of ear portions, and residual stress was reduced. Moreover, in addition to the ear portions, residual stress in other parts was also reduced at the same time.

As described above, in the torsion beam 600B of Example of the present invention, it was verified that residual stress can be electively reduced compared to the torsion beam 500A of Comparative Example.

In addition, as it can be understood from the result of this Example 2, the degree of reduction of residual stress inside the torsion beam 600B is substantially proportional to the degree of reduction of residual stress on the outer surface thereof. Therefore, if the residual stress on the outer surface of the ear portion is measured, the degree of reduction of residual stress on the inner surface of the ear portion can also be estimated.

Essentials of the embodiment will be summarized below.

(1) According to the present embodiment, there is provided a method of manufacturing a torsion beam 10 in which across section orthogonal to a longitudinal direction includes a uniformly shaped closed cross-sectional portion 11 which has a closed cross section of a substantial V-shape or a substantial U-shape with a pair of eat portions (the pair of folded wall portions 130), and longitudinal direction shape chancing portions 12 which lead to the uniformly shaped closed cross-sectional portion 11 and in which a shape of the closed cross section changes progressively away from the uniformly shaped closed cross-sectional portion 11. The torsion beam manufacturing method includes thickening for forming a pair of thickened portions in at least the longitudinal direction shape changing portions 12 by pressurizing each of the pair of ear portions from outside against swelling of the pair of ear portions in a state where both outer surfaces of each of the pair of ear portions are supported.

In the pair of ear portions before the thickening, residual stress is caused in each portions including the pair of ear portions. In the manufacturing method according to (1), this residual stress can be eliminated or reduced by pressurizing the pair of ear portions from outside and causing the pair of ear portions to be plastically deformed during the thickening. In the related art, such residual stress has not been able to be eliminated or reduced unless special processing such as hydro-form forming is performed, so that much time and effort have been required. According to the present aspect, residual stress can be reduced through simple press working without requiring such time and effort.

Therefore, according to the torsion beam manufacturing method of the present embodiment, the torsion beam 10 having excellent fatigue properties can be easily and efficiently manufactured.

(2) In the torsion beam manufacturing method according to (1), for example, as described by using FIG. 7B, during the thickening, the pair of ear portions may be pressurized in a state where an inner surface of the closed cross section is supported by the punching dies P100, excluding the pair of ear portions.

In the case according to (2), since deformation of a part other than the pair of ear portions can be prevented by supporting the part other than the pair of car portions with the punching dies P100, a pressurizing force applied to the pair of ear portions can be concentrated in thickening processing of the pair of ear portions. As a result, residual stress of each of the portions including the pair of ear portions can be more reliably eliminated or reduced.

(3) In the torsion beam manufacturing method according to (1) or (2), during the thickening, the pair of ear portions may be pressurized such that a maximum value for a plate thickness in the thickened portion ranges from 1.01 to 1.50 times a plate thickness in a part other than the thickened portion in the same cross section.

(4) According to the present embodiment, there is provided an apparatus for manufacturing a torsion beam 10 in which a cross section orthogonal to a longitudinal direction includes a uniformly shaped closed cross-sectional portion 11 which has a closed cross section of a substantial V-shape or a substantial U-shape with a pair of ear portions (the pair of folded wall portions 130), and a longitudinal direction shape changing portions 12 which lead to the uniformly shaped closed cross-sectional portion 11 and in which a shape of the closed cross section changes progressively away from the uniformly shaped closed cross-sectional portion 11. The torsion beam manufacturing apparatus includes a first die (lower fixed die D110 and upper movable die D120) which supports both outer surfaces of the pair of ear portions, and a second die (thickening treatment pressurizing member D130) which pressurizes top portions of the pair of ear portions from outside toward an inside of the closed cross section.

In the torsion beam manufacturing apparatus according to (4), before thickening processing is performed, residual stress remains in each of portions including the pair of ear portions. In the present embodiment, residual stress can be eliminated or reduced when the second die pressurizes the top portions of the pair of ear portions from outside toward the inside of the closed cross section and causes the pair of ear portions to be plastically deformed in a state where the first die supports both outer surfaces of the pair of ear portions.

Therefore, according to the torsion bean manufacturing apparatus of the present embodiment, the torsion beam 10 having excellent fatigue properties can be easily and efficiently manufactured.

(5) The torsion beam manufacturing apparatus according to (4) may further include a third die (punching dies P100) which supports an inner surface excluding the pair of ear portions within the closed cross section.

In the case of (5), since deformation can be prevented by the third die supporting the part other than the pair of ear portions from the inside, a pressurizing force applied to the pair of ear portions can be concentrated in the thickening processing of the pair of ear portions. As a result, residual stress of each of the portions including the pair of ear portions can be more reliably eliminated or reduced.

(6) According to the present embodiment, there is provided a torsion beam 10 in which a cross section orthogonal to a longitudinal direction includes a uniformly shaped closed cross-sectional portion 11 which has a closed cross section of a substantial V-shape or a substantial U-shape with a pair of ear portions (pair of folded wall portions 130), and shape changing portions 12 which lead to the uniformly shaped closed cross-sectional portion 11 and in which a shape of the closed cross section changes progressively away from the uniformly shaped closed cross-sectional portion 11. Each of the pair of ear portions in at least the shape changing portions 12 forms a thickened portion having a plate thickness greater than a plate thickness of a part other than the pair of ear portions. Residual stress at a thickest position where each of the thickened portions, has the greatest plate thickness is equal to or lower than 70% of tensile strength estimated from Vickers hardness on an outer surface at the same thickest position.

In the pair of ear portions before the thickened portion is formed, residual stress is caused in each of the portions including the pair of ear portions. However, the torsion beam of the aspect according to (6) is a torsion beam that is manufactured by the torsion beam manufacturing method of the aspect according to (1) or the torsion beam manufacturing apparatus of the aspect according to (4), and residual stress is eliminated or reduced due to the reasons described above. Then, residual stress at the thickest position where each of the thickened portions has the greatest plate thickness is equal to or lower than 70% of the tensile strength estimated from the Vickers hardness on the outer surface at the same thickest position.

Therefore, the torsion beam 10 which has excellent fatigue properties and is easily and efficiently manufactured is realized.

(7) In the torsion beam 10 according to (6), the plate thickness at the thickest position ranges from 1.01 to 1.50 times the plate thickness of the part other than the thickened portion in the same cross section.

INDUSTRIAL APPLICABILITY

According to the present invention, it is possible to provide a torsion beam having excellent fatigue properties. In addition, it is also possible to provide a torsion beam manufacturing method and a torsion beam manufacturing apparatus capable of easily and efficiently manufacturing such a torsion beam. Thus, industrial applicability is significant.

BRIEF DESCRIPTION OF THE REFERENCE SYMBOLS 1 torsion beam-type rear suspension apparatus (torsion beam-type suspension apparatus)
2 torsion beam assembly
5 trailing arm (arm)
10 torsion beam
11 uniformly shaped closed cross-sectional portion
12 longitudinal direction shape changing portion (shape changing portion)
13 attachment closed cross-sectional portion
14 attachment portion
100 torsion beam manufacturing apparatus
110 first wall portion
120 second wall portion
130 folded wall portion
131 first wall portion side folded point
132 second wall portion side folded point
140 thickening treatment portion
D110 lower fixed die (second wall portion supporting die, torsion beam material supporting member)
D120 upper movable die (first wall portion supporting die, torsion beam material supporting member)
D130 thickening treatment pressurizing member
M10 torsion beam material
M130 folded wall portion scheduled portion
M140 thickening treatment scheduled portion

The invention claimed is:

1. A torsion beam manufacturing method for manufacturing a torsion beam which is provided with a uniformly shaped closed cross-sectional portion in which a cross section orthogonal to a longitudinal direction is a closed cross section having a substantial V-shape or a substantial U-shape with a pair of ear portions, and a shape changing portion which leads to the uniformly shaped closed cross-sectional portion and in which a shape of the closed cross section changes progressively away from the uniformly shaped closed cross-sectional portion, the torsion beam manufacturing method comprising:
    thickening to form a pair of thickened portions in at least the shape changing portion by pressurizing each of the pair of ear portions from outside against swelling of the pair of ear portions in a state where both outer surfaces of each of the pair of ear portions are supported.

2. The torsion beam manufacturing method according to claim 1,
    wherein in the thickening, the pair of ear portions is pressurized in a state where an inner surface of the closed cross section is supported excluding the pair of ear portions.

3. The torsion beam manufacturing method according to claim 1,
    wherein in the thickening, the pair of ear portions is pressurized such that a maximum value for a plate thickness in the thickened portion ranges from 1.01 to 1.50 times a plate thickness in a part other than the thickened portion in the same cross section.

4. A torsion beam comprising:
    a uniformly shaped closed cross-sectional portion of which a cross section orthogonal to a longitudinal direction is a closed cross section having a substantial V-shape or a substantial U-shape with a pair of ear portions; and a shape changing portion which leads to the uniformly shaped closed cross-sectional portion and in which a shape of the closed cross section changes progressively away from the uniformly shaped closed cross-sectional portion, wherein each of the pair of ear portions in at least the shape changing portion forms a thickened portion having a plate thickness greater than a plate thickness of a part other than the pair of ear portions, and wherein a residual stress at a thickest position where each of the thickened portions has the greatest plate thickness is equal to or lower than 70% of a tensile strength estimated from Vickers hardness on an outer surface at the same thickest position.

5. The torsion beam according to claim 4, wherein the plate thickness at the thickest position ranges from 1.01 to 1.50 times the plate thickness of the part other than the thickened portion in the same cross section.

6. The torsion bean manufacturing method according to claim 2, wherein in the thickening, the pair of ear portions is pressurized such that a maximum value for a plate thickness in the thickened portion ranges from 1.01 to 1.50 times a plate thickness in a part other than the thickened portion in the same cross portion.

\* \* \* \* \*